United States Patent
Bi et al.

(10) Patent No.: US 10,635,273 B1
(45) Date of Patent: Apr. 28, 2020

(54) RAPIDLY GENERATING HELP ACCESS POINT USER INTERFACE FLOWS

(71) Applicant: Lyft, Inc., San Francisco, CA (US)

(72) Inventors: Yunjie Bi, Brooklyn, NY (US); Evan Robert Tarrh, New York, NY (US)

(73) Assignee: LYFT, INC., San Francisco, CA (US)

( * ) Notice: Subject to any disclaimer, the term of this patent is extended or adjusted under 35 U.S.C. 154(b) by 0 days.

(21) Appl. No.: 16/440,745

(22) Filed: Jun. 13, 2019

(51) Int. Cl.
*G06F 3/0484* (2013.01)
*G06F 8/38* (2018.01)
*G06F 9/451* (2018.01)
*G06F 3/0482* (2013.01)

(52) U.S. Cl.
CPC .......... *G06F 3/0484* (2013.01); *G06F 3/0482* (2013.01); *G06F 8/38* (2013.01); *G06F 9/453* (2018.02)

(58) Field of Classification Search
CPC .................................................... G06F 3/0484
USPC ........................................................ 715/713
See application file for complete search history.

(56) References Cited

U.S. PATENT DOCUMENTS

| | | | | |
|---|---|---|---|---|
| 9,245,241 B2* | 1/2016 | Kite | .................. | G06Q 10/06 |
| 9,516,053 B1* | 12/2016 | Muddu | .............. | H04L 63/1408 |
| 10,560,468 B2* | 2/2020 | Muddu | .............. | G06F 16/9024 |
| 2010/0254308 A1* | 10/2010 | Laroia | .................. | H04W 8/005 |
| | | | | 370/328 |
| 2012/0284291 A1* | 11/2012 | Brown | .............. | G06Q 10/0631 |
| | | | | 707/756 |

* cited by examiner

*Primary Examiner* — William D Titcomb
(74) *Attorney, Agent, or Firm* — Keller Jolley Preece

(57) ABSTRACT

The present application discloses an improved help access point configuration system, and corresponding methods and computer-readable media. According to disclosed embodiments, a help access point configuration system receives and digests help access point configuration files. In response to receiving an indication of a detected user interaction in connection with a help access point, the help access point configuration system determines a help access point flow position associated with the user. Furthermore, the help access point configuration system can generate a help access point user interface based on the user's help access point flow position and the detected user interaction.

20 Claims, 15 Drawing Sheets

RAPIDLY GENERATING HELP ACCESS POINT USER INTERFACE FLOWS

BACKGROUND

Recent years have seen significant improvement in hardware and software platforms for user interface development. Indeed, conventional systems provide mechanisms and tools by which engineers can develop robust and interactive user interfaces. For example, conventional systems include programming suites where engineers can program user interfaces that include interactive controls, rich displays, and other features.

Although conventional systems provide such programming suites for user interface development, conventional systems are often inefficient, inflexible, and inaccurate when used in connection with rapid interface prototyping for frequently updated user interface systems. Indeed, as a result of the limitations on efficiency, flexibility, and accuracy, no system currently exists for rapid user interface development in connection with frequent updates to user interfaces associated with one or more help access points within a dynamic transportation matching system native application.

For example, conventional systems generally embody a slow development and release cycle. For instance, conventional systems require engineers to code a user interface utilizing one of various programming languages. The coded user interface must then be tested and compiled into a native application update before it can be released to end users. As such, user interface development utilizing conventional systems is inefficient and slow because user interface development may not be undertaken by a general user (e.g., a user with no programming training or experience), and any resulting user interface code must go through additional testing and compilation prior to release. This is particularly unsuitable when used in connection with systems such as help access point systems that require frequently updated user interfaces.

Moreover, when a conventional system compiles a native application update including new user interfaces, the conventional system rigidly requires that a user must update his or her native application before he or she can utilize the new user interfaces. However, even though users generally fail to immediately run application updates when needed, convention systems offer no other more flexible way of providing the new user interfaces to a client device. This is especially problematic with regard to frequently updated user interfaces such as those utilized in connection with help access points.

Furthermore, conventional user interface systems generally give rise to inaccuracies when those conventional systems are utilized in connection with rapid user interface development. For example, in an area that requires frequently updated user interfaces (e.g., such as help access points within a heavily utilized transportation matching system native application), conventional systems place a heavy load on user interface engineers. To illustrate, conventional systems require a high level of specialized knowledge and training from user interface engineers. This, in turn, means that when user interface changes are needed in a hurry, those user interface engineers must work around the clock because no one else is qualified to handle the complexities of user interface programming. This type of high-pressure work inevitably leads to coding mistakes, system bugs, and other inaccuracies.

Thus, there are several technical problems with regard to conventional user interface systems.

BRIEF DESCRIPTION OF THE DRAWINGS

The detailed description is described with reference to the accompanying drawings in which.

DETAILED DESCRIPTION

Figure 1:
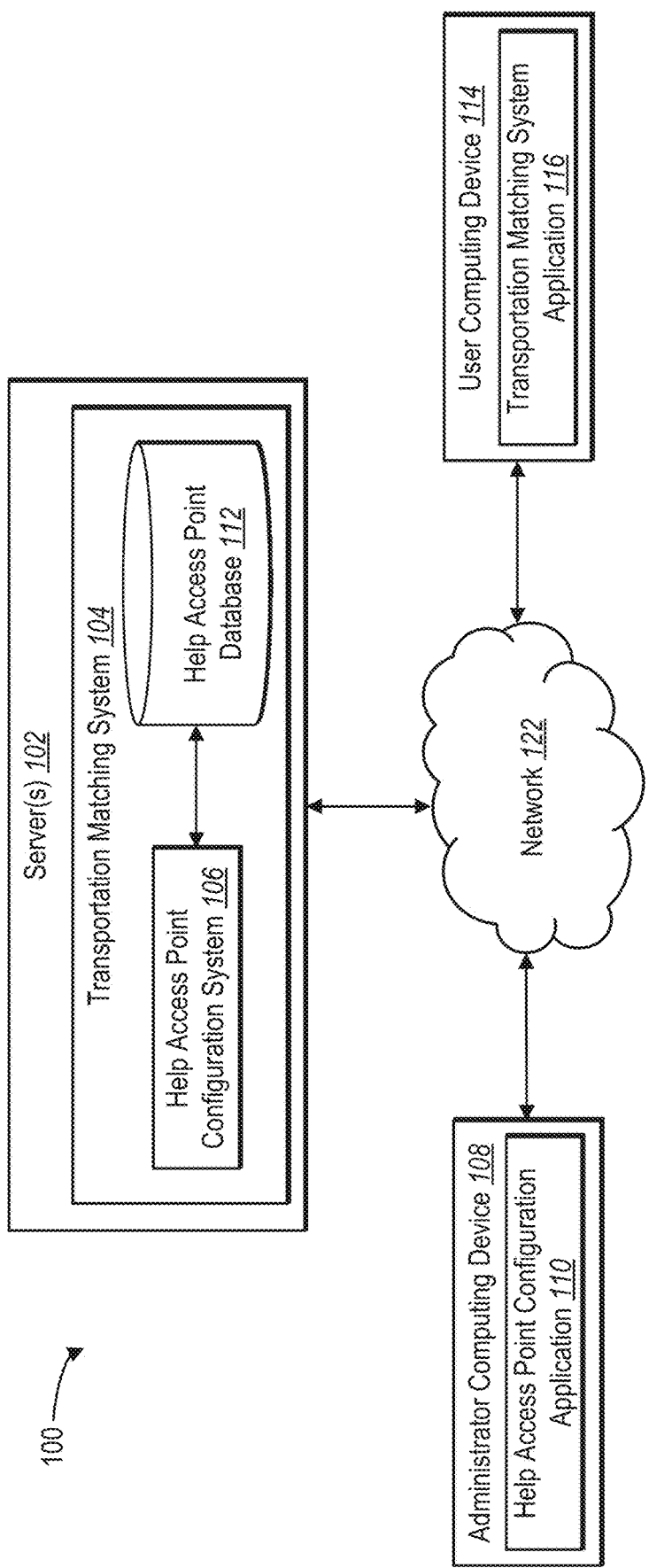
FIG. 1 illustrates an example environment in which a help access point configuration system operates in accordance with one or more embodiments.

One or more embodiments of the present disclosure includes a help access point configuration system that receives and digests help access point configuration files in order to rapidly generate and provide help access point user interface flows to user computing devices via a dynamic transportation matching system native application. For example, the help access point configuration system can receive a configuration file that includes instructions for generating a help access point user interface within a help access point flow. After receiving user interaction information from a user computing device, the help access point configuration system can determine a help access point flow position associated with the user computing device and utilize a help access point configuration file to rapidly generate a user interface that corresponds to the user computing device's help access point flow position. The help access point configuration system can provide the generated user interface to the user computing device and cause the user computing device to display the user interface without requiring any application updates. Thus, the help access point configuration system efficiently, flexibly, and accurately generates help access point user interfaces for display via a dynamic transportation matching system native application without requiring specialized engineering effort.

To illustrate, the help access point configuration system receives and digests help access point configuration files that may be authored by general users with no specialized engineering knowledge or training. For example, a help access point configuration file can include information including display instructions, display component implementations, static display information, and transition information—all written in an easily-understood format. In at least one embodiment, the help access point configuration system digests a help access point configuration file by parsing the information contained in the help access point configuration file, fetching requested files and display components, and testing transitions. The help access point configuration system further digests the help access point configuration file by organizing the help access point configuration file into a hierarchy or similar scheme according to configuration files that reference the help access point configuration file and configuration files that the help access point configuration file references.

Additionally, the help access point configuration system can receive a help access point session request from a user computing device. For example, a provider or requestor may interact with a help access point (e.g., a "Help FAQ" selectable list item) within a transportation matching system application on a provider or requestor computing device. In response to this detected user interaction with a help access point, the help access point configuration system can initiate a help access point session and identify a help access point configuration file that corresponds to the resulting session.

In one or more embodiments, the help access point configuration system also generates a help access point user interface associated with the initiated help access point session. For example, the help access point configuration system can identify a help access point configuration file that corresponds to the initiated help access point session, and can utilize the help access point configuration file to generate a user interface. In at least one embodiment, and as will be discussed further below, the help access point configuration system generates a user interface by fetching referenced display components and assembling the display components according to the instructions laid out in the help access point configuration file.

The help access point configuration system can also provide generated user interfaces to a user computing device based on the help access point flow position associated with the user computing device. For example, the help access point configuration system can determine a flow position associated with a user computing device based on previously provided user interfaces and detected user interactions with components of those user interfaces. As such, the help access point configuration system can appropriately generate a user interface for each branch within a help access point flow based on how the user computing device has moved through that flow and on how a user has interacted with each user interface in that flow.

The help access point configuration system provides many advantages and benefits over conventional systems and methods. For example, by utilizing help access point configuration files, the help access configuration system improves efficiency relative to conventional systems. Specifically, as mentioned above, the help access point configuration files are not computer code requiring the attention of engineers with specialized knowledge and training. As such, the help access point configuration system avoids the lengthy development and release cycle typified by conventional systems by utilizing easily authored help access point configuration files that do not need to be compiled into a native system update.

Additionally, by utilizing non-compiled help access point configuration files, the help access configuration system improves flexibility of conventional systems. For example, as mentioned above and as will be discussed further below, the help access point configuration system can generate help access point user interfaces based on help access point configuration files. In one or more embodiments, the help access point configuration system can provide generated help access point user interfaces to a user computing device one by one and on-the-fly during an established session, without rigidly having to package the generated user interfaces into an application update or patch, which a user must install prior to being able to access the newly generated user interfaces.

Moreover, by utilizing non-coded help access point configuration files, the help access point configuration system improves the accuracy of conventional systems by relieving the burden placed on highly trained engineers. For example, as mentioned above, the help access point configuration files may be authored by a general user who has no specialized training with regard to computer programming. As such, in rapid development cycles such as those typical to help access point user interfaces, the development burden is shared across a larger population of developers. This, in turn, leads to fewer pressure-born mistakes and system bugs.

As illustrated by the foregoing discussion, the present disclosure utilizes a variety of terms to describe features and advantages of the help access point configuration system. For example, as used herein, a "help access point" refers to a help system gateway within a dynamic transportation matching system application. Various help access points exist within the dynamic transportation matching system based on user type and location. For example, as will be discussed in greater detail below, help access points can include interactive display components that allow users access to provider help, provider past ride help, provider mid-ride help, requestor help, and requestor past ride help.

Also as used herein, a "help access point configuration file" (or "configuration file") refers to an electronic document including instructions for generating a help access point user interface. For example, and as will be discussed in greater detail below, a help access point configuration file can include, but is not limited to, instructions for display component placement, transitions, and static text. The help access point configuration system can digest a received help access point configuration file in order to later generate a user interface based on the help access point configuration file.

As used herein, a "help access point session request" refers to a request received from a user computing device that initiates a help access point session between the dynamic transportation matching system and the user computing device. During an initiated help access point session, the help access point configuration system can generate and provide help access point user interfaces to the user computing device. Additionally, during an initiated help access point session, the user computing device can move through a help access point user interface flow.

As further used herein, a "help access point flow" refers to a potential path that exists through a series of help access point user interfaces. For example, a configuration file may be linked to by one or more other configuration files by defined transitions. Similarly, the same configuration file may link to one or more additional configuration files. As such, a user computing device may move through a series of user interfaces generated based on the linked configuration files in a help access point flow. In at least one embodiment, a help access point flow exists within a "help access point flow hierarchy," which contains all potential flows of help access point user interfaces associated with a particular help access point.

As used herein, a "requestor" refers to a transportation matching system user (e.g., a rider) who utilizes a requestor computing device to send a transportation request to the transportation matching system. In one or more embodiments, the requestor computing device is a handheld computing device such as a smart phone or smart wearable that includes a transportation matching system application, as will be described in greater detail below.

As used herein, a "provider" refers to a transportation matching system user (e.g., a driver) who drives a vehicle in order to transport requestors. Alternatively, in at least one embodiment, the provider refers to an autonomous vehicle that is integrated with the transportation matching system. In one or more embodiments, the provider utilizes a provider computing device that is a handheld computing device such as a smart phone. In at least one embodiment, the provider computing device includes a transportation matching system application, similar to the requestor computing device. In one or more embodiments, however, the transportation matching system application makes different options and features available on the provider computing device than it does on the requestor computing device. In yet further embodiments, the transportation matching system application on the provider client device is a different version than the application used by requestors.

FIG. 1 illustrates an example environment 100 for the help access point configuration system 106 including the administrator computing device 108, and the user computing device 114. As shown, in one or more embodiments, the help access point configuration system 106 can be a component of a dynamic transportation matching system 104 implemented on one or more server(s) 102. As further shown in FIG. 1, the administrator computing device 108 and the user computing device 114 communicate with the help access point configuration system 106 via a network 122.

In one or more embodiments, the network 122 shown in FIG. 1 may include one or more networks and may use one or more communication platforms or technologies suitable for transmitting data and/or communication signals. In one or more embodiments, the network 122 includes a cellular network. The network 122 can additionally include the Internet or World Wide Web. Additionally or alternatively, the network 122 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

In one or more embodiments, the user computing device 114 can be one of various types of computing devices. For example, in at least one embodiment, the user computing device 114 can be a provider computing device, a requestor computing device, or a rider computing device. To illustrate, a provider computing device can be associated with a transportation provider who receives transportation matches from the transportation matching system 104 via the transportation matching system application 116. A requestor computing device can be associated with a transportation requestor who submits transportation requests to the transportation matching system 104 via the transportation matching system application 116. A rider computing device can be associated with a rider who utilizes the transportation matching system application 116 to engage a bicycle or scooter associated with the transportation matching system 104.

FIG. 1 illustrates that the server(s) 102 includes the transportation matching system 104. In one or more embodiments, the dynamic transportation matching system 104 receives transportation match requests from a requestor computing device (e.g., one embodiment of the user computing device 114) and provides a generated transportation match to a provider computing device (e.g., another embodiment of the user computing device 114). The provider can transport the requestor to a location specified in the transportation match request.

Additionally, the transportation matching system 104 includes the help access point configuration system 106 and the help access point database 112. In one or more embodiments, the help access point configuration system 106 receives and digests help access point configuration files from the administrator computing device 108. The help access point configuration system 106 can also receive help access session requests from the user computing device 114. In response to receiving a session request, the help access point configuration system 106 can generate help access point user interfaces based on the received help access point configuration files and utilizing the contents of the help access point database 112. For example, the help access point database 112 can include static text files, digital media files (e.g., digital images, digital video), and a repository of digested help access point configuration files.

As further illustrated in FIG. 1, the user computing devices 114 includes a transportation matching system application 116. In one or more embodiments, the transportation matching system application 116 enables providers, requestors, riders, and any other users to interact with features of the transportation matching system 104. For example, at any point prior to, during, or after the requested transportation, a user of the user computing device 114 can interact with a help access point via the transportation matching system application 116 in order to initiate a help access system session with the help access point configuration system 106.

In one or more embodiments, the transportation matching system application 116 may be a native application. For example, the transportation matching system application 116 can be a mobile application that installs and runs on mobile devices, such as a smart phone, tablet computer, or smart wearable. Alternatively, the transportation matching system application 116 can be a desktop application, a widget, or any other form of native computing program. Furthermore, the transportation matching system application 116 may be a remote application accessed by the user computing device 114. For example, the transportation matching system application 116 may be a web application that is executed within a web browser of the user computing device 114.

Figure 2:
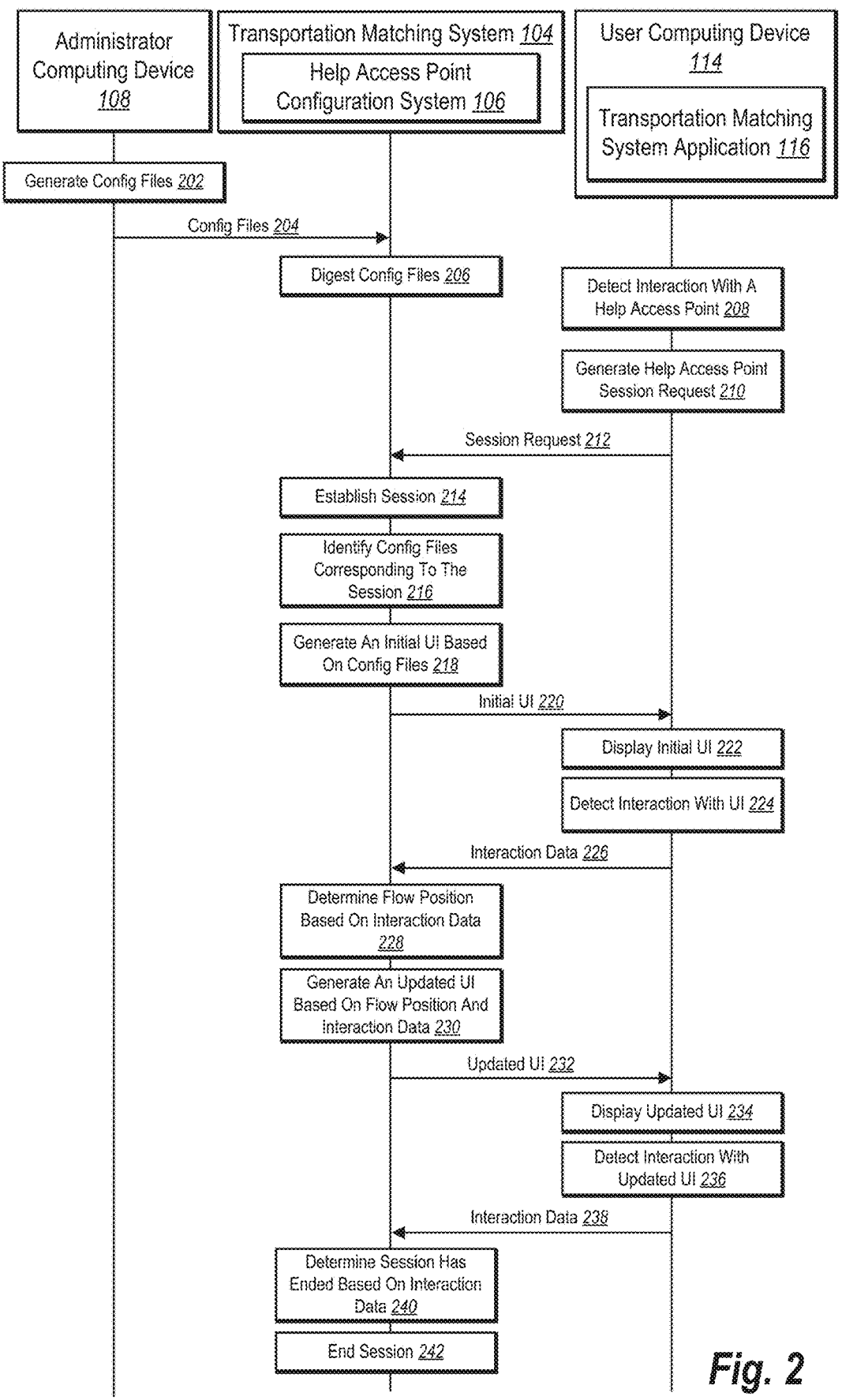
FIG. 2 illustrates a sequence diagram of generating and providing help access point user interfaces in accordance with one or more embodiments.

As mentioned above, the help access point configuration system 106 receives and digests help access point configuration files in order to generate help access point user interfaces for user devices. FIG. 2 includes a sequence diagram illustrating acts involved in the process by which the help access point configuration system 106 accomplishes these tasks. For example, as shown in FIG. 2, the sequence begins when the administrator computing device 108 generates a help access point configuration file (202). In one or more embodiments, the administrator computing device 108 generates a configuration file to include display configuration instructions, display component instructions, and transition instructions. In at least one embodiment, as mentioned above, the administrator computing device 108 generates a help access point configuration file in a format that does not require compilation (e.g., in a scripting language such as JavaScript Object Notation or JSON). The contents and methodology associated with help access point configuration files is discussed in greater detail below with reference to FIG. 6.

In response to receiving one or more help access point configuration files (204) from the administrator computing device 108, the help access point configuration system 106 can digest the received help access point configuration files (206). In one or more embodiments, the help access point configuration system 106 begins digesting a help access point configuration file by parsing the configuration file into one or more portions or segments. For example, the help access point configuration system 106 can parse a help access point configuration file based on brackets, tags, and other keywords in order to separate the configuration file into objects, arrays, links, and other system calls.

In addition to parsing the help access point configuration file, the help access point configuration system 106 can further digest the configuration file by determining the configuration file's relationship with one or more addition help access point configuration files. For example, although the help access point configuration system 106 is state-less, every help access point configuration file exists as part of a help access point flow including two or more configuration files. As such, the help access point configuration system 106 can generate and provide user interfaces based on configuration files based on user interactions and a flow position associated with the user computing device 114 (e.g., a requestor computing device). Thus, the help access point configuration system 106 can digest a help access point configuration file by identifying transition statements (e.g., associated with an action following a detected selection of a "Next" button) that indicate a next configuration file in the flow.

Similarly, the help access point configuration system 106 can identify one or more additional configuration files that a help access point configuration file references. For example, the help access point configuration file may include display instructions for providing display components that, when selected, cause the help access point configuration system 106 to transition the flow to additional user interfaces. As such, the help access point configuration system 106 can identify the configuration files associated with those additional user interfaces.

With these additional transitional user interface identified, the help access point configuration system 106 can add the new help access point configuration file to a help access point flow hierarchy of configuration files. For example, the help access point configuration system 106 can structure the help access point flow hierarchy such that a configuration file is linked to all additional configuration files that the configuration file references. Organizing the help access point flow hierarchy in this manner ensures that there are no missing transitions in each included help access point flow.

In one or more embodiments, the help access point configuration system 106 can further digest a help access point configuration file by performing certain tests and error checks in connection with the configuration file. For example, as will be discussed further in connection with FIG. 6 below, the help access point configuration system 106 can perform error detection that ensures every file and transition referenced in the configuration file exists within the help access point database 112. If the configuration file fails the error detection algorithms, the help access point configuration system 106 can return an error message to the administrator computing device 108. If the configuration file passes the error detection algorithms, the help access point configuration system 106 can add the configuration file to the help access point database 112 in association with other configuration files that exist in the same help access point flow hierarchy of configuration files.

Furthermore, as illustrated in FIG. 2, the user computing device 114 can detect an interaction with a help access point (208). For example, the transportation matching system application 116 may include one or more help access points. To illustrate, a help access point may be a display component or other feature that provides access to the help access point configuration system 106. For example, in one or more embodiments, a help access point may include a selectable button (e.g., a "Help" button) or similar.

In response to a detected interaction with a help access point, the transportation matching system application 116 can generate a help access point session request (210). In one or more embodiments, the transportation matching system application 116 generates a help access point session request to include account information associated with the user computing device 114, and information associated with the help access point with which the interaction was detected. For example, a generated help access point session request can include a transportation matching system user account identifier, an identifier associated with the user computing device 114 (e.g., a phone number), other information associated with the user, and information associated with recent activity within the transportation matching system application 116. Additionally, the generated help access point session request can include information (e.g., name and timestamp) associated with the help access point with which the transportation matching system application 116 detected a user interaction.

In response to receiving the generated help access point session request (212), the help access point configuration system 106 can establish a help access point session (214) with the user computing device 114. In one or more embodiments, the help access point configuration system 106 establishes a help access point session in order to efficiently track a user computing device's progress through a help access point flow, and to effectively collect information associated with the type of help requested. In at least one embodiment, the help access point configuration system 106 establishes a help access point session by assigning a secure connection to the user computing device 114, or by otherwise dedicating computing resources to the user computing device 114 until the established help access point session ends.

With the help access point session established, the help access point configuration system 106 can identify one or more help access point configuration files that correspond to the established session (216). For example, as mentioned above, various help access point flow hierarchies exist in association with different help access points. Accordingly, the help access point configuration system 106 can identify a help access point flow hierarchy of help access point configuration files based on: a type associated with the requestor, and on the user interaction that initiated the help access point session request. For example, the help access point configuration system 106 can analyze information associated with requestor (e.g., received in the session request) to determine a user type associated with the requestor (e.g., requestor or provider). The help access point configuration system 106 can also analyze information associated with the detected user interaction that initiated the help access point session request to determine a type of help access point session requested. Then, the help access point configuration system 106 can identify the help access point flow hierarchy of help access point configuration files associated with the user type and type of help access point session.

After identifying the help access point configuration files corresponding to the established session, the help access point configuration system 106 can generate an initial user interface based on the identified configuration files (218). For example, in at least one embodiment, the help access point configuration system 106 can identify an initial configuration file in the help access point flow hierarchy of help access point configuration files by identifying the configuration file in the hierarchy that includes a tag or keyword indicating that it is the first configuration file in the flow.

With the initial configuration file identified, the help access point configuration system 106 can generate a user interface based on the initial help access point configuration file. In one or more embodiments, the help access point configuration system 106 generates a user interface by fetching display components referenced by the initial help access point configuration file and assembling the display components into a user interface based on instructions in the initial help access point configuration file. For example, as will be discussed in greater detail below, the initial help access point configuration file may reference one or more display components such as, but not limited to, buttons, lists, media items (e.g., digital video, digital images), static text, and hyperlinks. Furthermore, the initial help access point configuration file may also include display instructions detailing the placement, spacing, and organization of these display components.

In one or more embodiments, the help access point configuration system 106 further generates the initial help access point user interface by adding transitions to the user interface based on the corresponding help access point configuration files. For example, as mentioned above, the help access point configuration system 106 generates user interfaces within a help access point flow including multiple user interfaces linked together by one or more transitions. As such, the help access point configuration system 106 can add transitions to the initial help access point user interface based on the corresponding configuration files by configuring one or more display components that transmit transition information back to the help access point configuration system 106 in response to user interactions. To illustrate, the help access point configuration system 106 can configure a display component such as a button to, in response to a detected interaction (e.g., a tap touch gesture), send transition information from the user computing device 114 to the help access point configuration system 106. In response to receiving this information, the help access point configuration system 106 can generate and provide an additional user interface to the user computing device 114 thereby causing a display transition thereon.

Accordingly, in response to generating the initial help access point user interface, the help access point configuration system 106 can provide the initial user interface (220) to the user computing device 114. After receiving the initial user interface, the transportation matching system application 116 can display the initial user interface (222) on a display of the user computing device 114. For example, the transportation matching system application 116 can display the initial user interface on a touch screen display of the user computing device 114 where a user of the user computing device 114 can interact with one or more interactive display components of the initial user interface.

In one or more embodiments, the transportation matching system application 116 can detect a user interaction with at least one display component of the initial user interface (224). For example, the transportation matching system application 116 can detect a user selection of a button, a list item, or any other interactive display component of the initial user interface.

In response to the detected interaction, the transportation matching system application 116 can provide information associated with the detected interaction (226) to the help access point configuration system 106. For example, the transportation matching system application 116 can provide information including, but not limited to, the title or identifier associated with the initial user interface, and the display component with which the user interacted.

After receiving this interaction data from the user computing device 114, the help access point configuration system 106 can determine a help access point flow position (228) associated with user computing device 114 based on the interaction data. As mentioned above, the help access point configuration system 106 utilizes interaction data and a flow position of a user computing device in order to generate and provide an additional user interface. In one or more embodiments, the help access point configuration system 106 determines a help access point flow position by identifying the configuration file associated with the initial user interface within the help access point flow hierarchy associated with the present session. After identifying the appropriate configuration file within the help access point flow hierarchy, the help access point configuration system 106 can determine the transition defined within the configuration file that is triggered by the user interaction. For example, the configuration file may define that in response to an interaction with a particular button within the initial user interface, the help access point configuration system 106 should generate and provide a new user interface based on the next configuration file in the help access point flow.

Accordingly, in response to determining the flow position associated with the user computing device 114, the help access point configuration system 106 can access the next configuration file in the help access point flow to generate an updated or second user interface (230). For example, the help access point configuration system 106 can generate the second user interface in the same manner described above with reference to the initial user interface. Furthermore, the help access point configuration system 106 can provide the updated user interface (232) to the user computing device 114 via the transportation matching system application 116.

After receiving the updated user interface from the help access point configuration system 106, the transportation matching system application 116 can display the updated user interface (234), and then can detect a user interaction with the second user interface (236). For example, as discussed above, the transportation matching system application 116 can detect a user touch gesture that interacts with a display component within the second user interface. As discussed above, the transportation matching system application 116 can provide the interaction data (238) to the help access point configuration system 106.

Upon receiving the interaction data from the user computing device 114, the help access point configuration system 106 can utilize the interaction data to determine that the current help access point session has ended (240). For example, as discussed above, the help access point configuration system 106 can utilize received interaction data to determine a user computing device's help access point flow position and next transition. In one or more embodiments, the help access point configuration system 106 can determine that the user computing device's flow position and the detected user interaction indicate that there is no next transition. Rather, the help access point configuration system 106 can determine that the session has ended based on the user computing device's flow position and the detected user interaction.

To illustrate, the updated user interface may be the last user interface in the current help access point flow. Accordingly, the configuration file associated with the second user interface may indicate that an interaction with any display component in the second user interface would lead to an action other than a transition to a different user interface. For example, the configuration file may indicate that an interaction with a display component causes the help access point configuration system 106 to generate a help ticket associated with the current help access point session and/or to end the current help access point session.

As such, the help access point configuration system 106 can end the help access point session (242). For example, the help access point configuration system 106 can terminate the secure connection with the user computing device 114, or otherwise release any computing resources dedicated to the session with the user computing device 114.

Additionally, in at least one embodiment, the help access point configuration system 106 can terminate the secure connection with the user computing device 114 in response to determining that the user of the user computing device 114 has abandoned the help access session. For example, at any point in the help access point flow, the user may close the transportation matching system application 116, may change display focus away from the transportation matching system application 116 for a threshold amount of time, or may otherwise stop interacting with the help access point configuration system 106. In response to determining that any of these events have occurred, the help access point configuration system 106 can end the help access point session (242).

Although the example in FIG. 2 illustrates how the help access point configuration system 106 utilizes help access point configuration files to generate and provide help access point user interfaces to a user computing device (e.g., a requestor computing device), additional embodiments can include other types of user computing devices. For example, in an additional embodiment, the help access point configuration system 106 utilizes help access point configuration files to generate and provide help access point users interfaces to a provider computing device and/or a rider computing device.

Additionally, while FIG. 2 illustrates the help access point configuration system 106 generating and providing user interfaces associated with a help access point flow that includes two help access point configuration files, additional embodiments can include larger help access point flows. For example, in one embodiment, the help access point configuration system 106 can continue to generate and provide user interfaces utilizing configuration files organized in a help access point flow of any size.

As discussed above, the help access point configuration system 106 generates a provides help access point user interfaces to a user computing device depending on detected user interactions from the user computing device and a flow position associated with the user computing device. FIGS. 3A-5D illustrate how the help access point configuration system 106 generates help access point user interfaces based on detected user interactions and determines help access point flow positions associated with user computing devices.

Figure 3B:
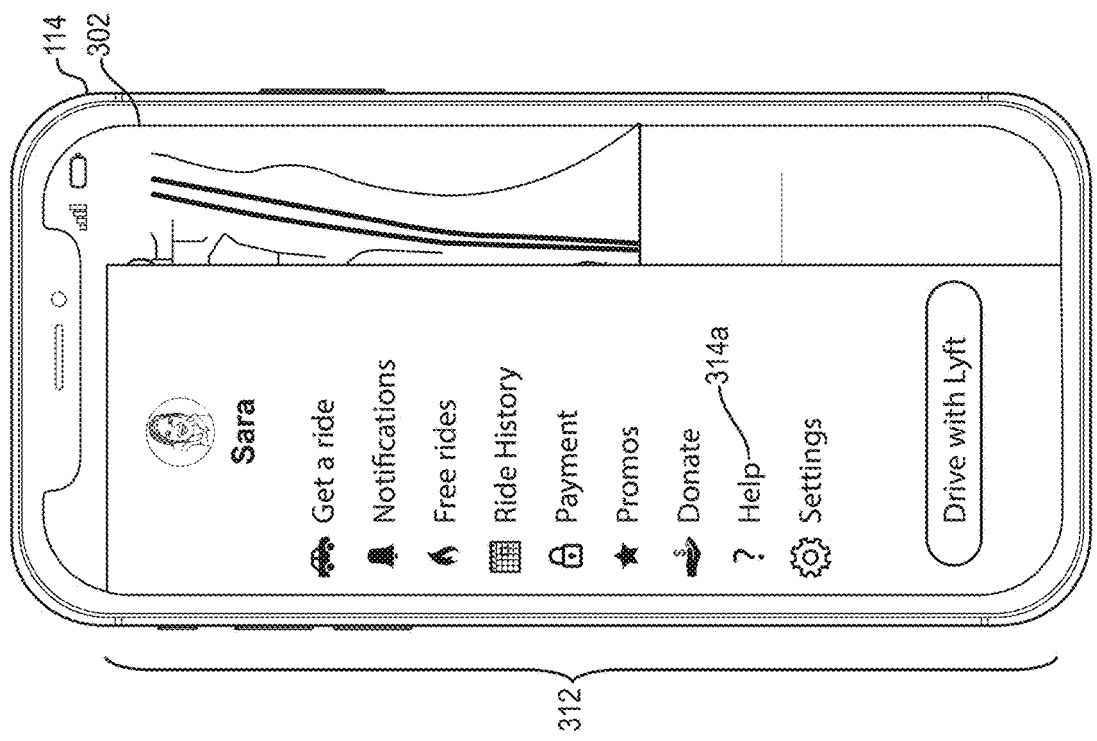
FIGS. 3A-3F illustrate a series of requestor help access point user interfaces in accordance with one or more embodiments.
Figure 3A:
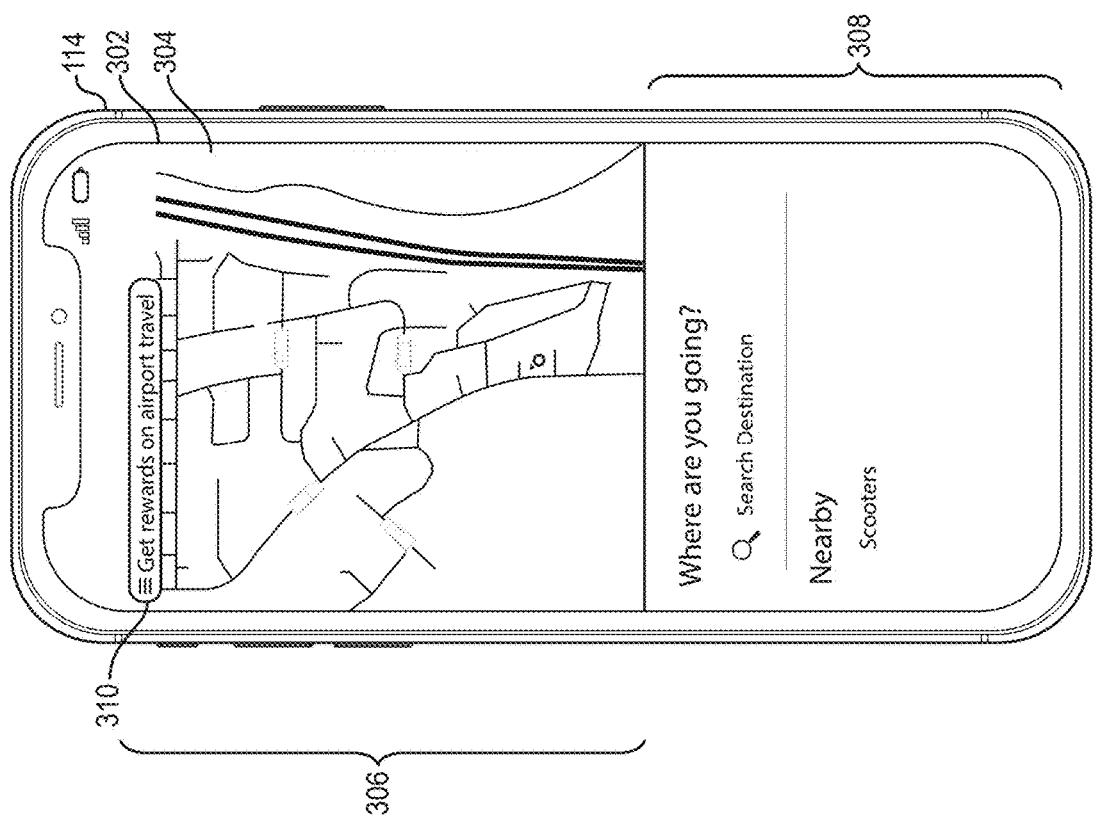

For example, FIGS. 3A-3F illustrate the help access point configuration system 106 generating and providing help access point user interfaces to a requestor computing device based on detected user interactions and a flow position associated with the requestor computing device. As shown in FIG. 3A, upon initiation, the transportation matching system application 116 can provide an initial transportation matching system user interface 304 on a touch screen display 302 of the user computing device 114. For example, the initial transportation matching system user interface 304 includes an interactive map overlay 306 and a user input area 308. Utilizing these sections a requestor (e.g., the user of the user computing device 114) can input transportation request information in order to submit a transportation matching request to the transportation matching system 104.

As further shown in FIG. 3A, the initial transportation matching system user interface 304 also includes a menu button 310. In response to a detected selection of the menu button 310, the requestor transportation matching system application 120 can provide a menu list 312, as shown in FIG. 3B. For example, the menu list 312 includes selectable list items that enable the user of the user computing device 114 to interact with various features of the transportation matching system 104.

Additionally, the menu list 312 includes a help access point 314*a*. In response to a detected selection of the help access point 314*a*, the requestor transportation matching system application 120 can generate a help access point session request and send the session request to the help access point configuration system 106. As discussed above with reference to FIG. 2, in response to receiving the session request, the help access point configuration system 106 establishes the session, and identifies a help access point flow hierarchy of help access point configuration files corresponding to the session. For example, the requestor transportation matching system application 120 can generate the session request to include information about the help access point 314*a* with which the user of the user computing device 114 interacted. The help access point configuration system 106 can then identify a flow hierarchy of help access point configuration files associated with the help access point 314*a*.

Figure 3D:
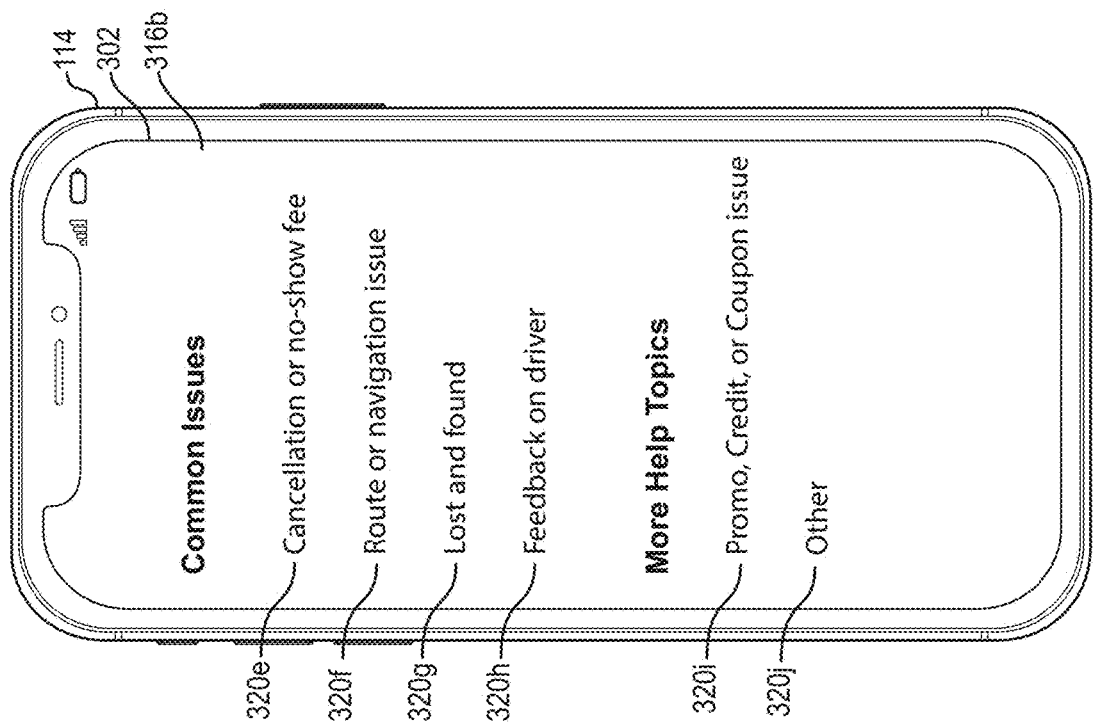
Figure 3C:
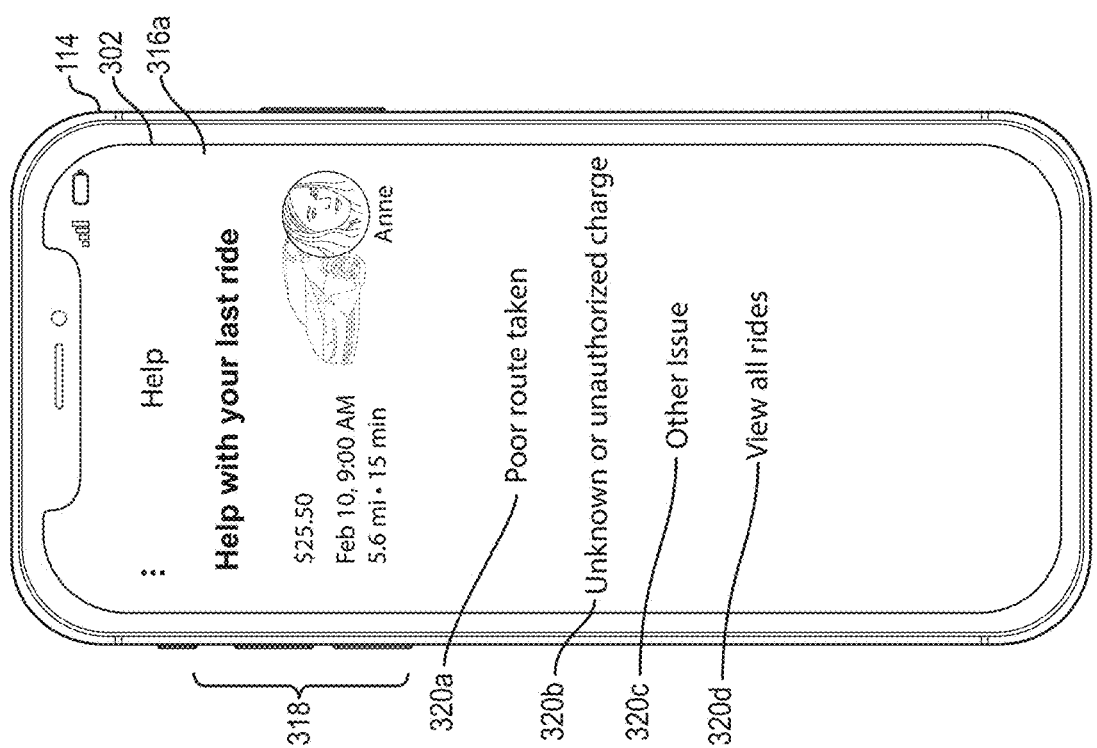

After identifying the corresponding flow hierarchy of help access point configuration files, the help access point configuration system 106 can generate and provide an initial help access point user interface. For example, as shown in FIG. 3C, the help access point configuration system 106 can generate and provide the initial requestor help access point user interface 316*a* to the user computing device 114. Based on the corresponding help access point configuration file, the help access point configuration system 106 generates the initial requestor help access point user interface 316*a* to include last ride information 318 and requestor display components 320*a*, 320*b*, 320*c*, and 320*d*.

In response to receiving an indication of a user interaction with one of the requestor display components 320*a*-320*d*, the help access point configuration system 106 can determine a help access point flow position associated with the user computing device 114 and generate an updated user interface. For example, in response to receiving an indication of a user interaction with the requestor display component 320*c* (e.g., "Other Issue"), the help access point configuration system 106 can determine the flow position associated with the user computing device 114 by analyzing the contents of the configuration file associated with the initial requestor help access point user interface 316*a* and determining that the flow position associated with the user computing device 114 is the first position in the associated flow hierarchy.

In response to determining the flow position associated with the user computing device 114, and in light of the detected interaction with the requestor display component 320*c*, the help access point configuration system 106 can identify a next configuration file in the flow hierarchy and generate an updated user interface utilizing the next configuration file. For example, as shown in FIG. 3D, the help access point configuration system 106 can generate and provide the requestor help access point user interface 316*b* including the requestor display components 320*e*-320*j*. As discussed above, in response to receiving an indication of a user interaction with at least one of the requestor display components 320*e*-320*j*, the help access point configuration system 106 can determine a flow position of the user computing device 114 and generate another updated help access point user interface.

Figure 3F:
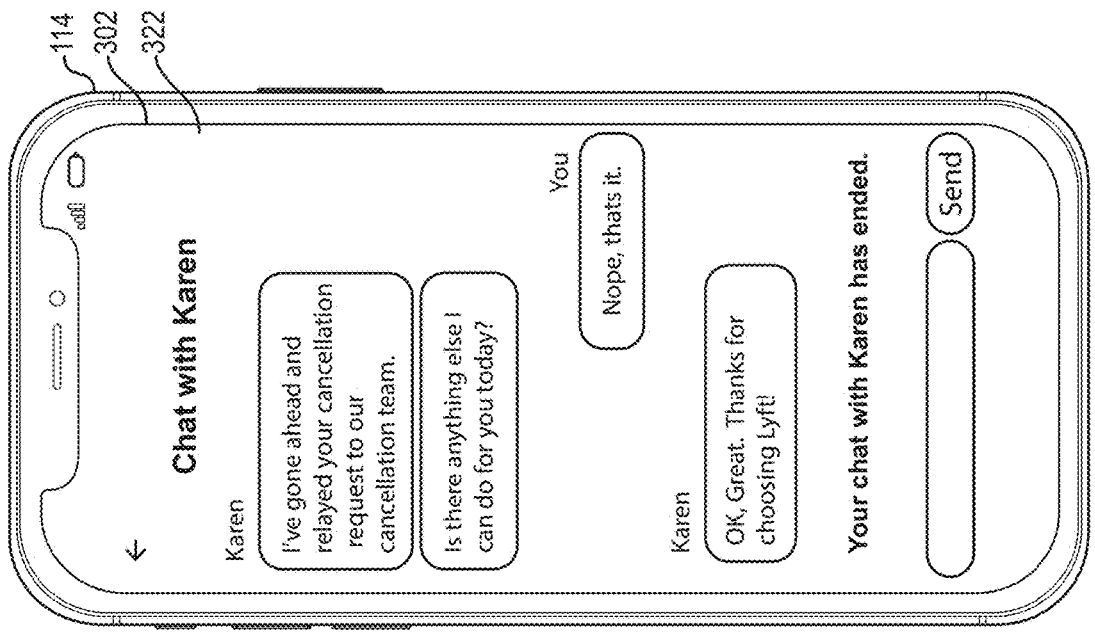
Figure 3E:
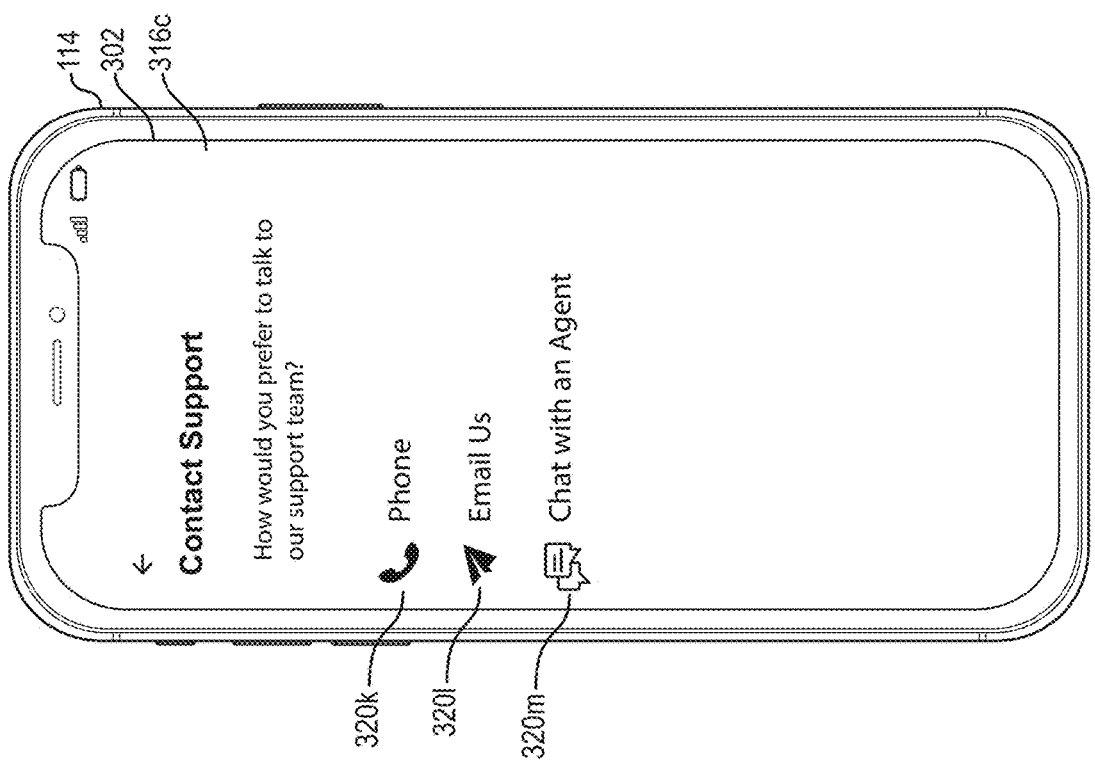

For example, as shown in FIG. 3E, the help access point configuration system 106 can generate and provide the updated requestor help access point user interface 316*c* to the user computing device 114. As shown, the help access point configuration system 106 can generate the updated requestor help access point user interface 316*c* to include the requestor display components 320*k*-320*m*. As discussed above, in response to receiving an indication of a user interaction with the requestor display component 320*m* (e.g., "Chat with an Agent"), the help access point configuration system 106 can determine a flow position of the user computing device 114. For example, by analyzing the configuration file associated with the updated requestor help access point user interface 316*c*, the help access point configuration system 106 can determine that the flow position associated with the user computing device 114 is at the end of the associated flow hierarchy.

Thus, in response to this determination and the detected user interaction with the requestor display component 320*m*, the help access point configuration system 106 can perform one or more actions. In one or more embodiments, the help access point configuration system 106 can transfer the user computing device 114 to a different system within the transportation matching system 104 and can end the current help access point session. For example, as shown in FIG. 3F, in response to determining that the user computing device 114 is at a flow position at the end of the associated flow hierarchy and the detected user interaction with the requestor display component 320*m*, the help access point configuration system 106 can transfer the user computing device 114 to a live customer service chat system and can end the current help access point session. In at least one embodiment, the help access point configuration system 106 can provide session information (e.g., a customer service "ticket") as part of the transfer to the live customer service chat system such that a customer service agent can effectively address the concerns of the user of the user computing device 114. Additionally, as shown in FIG. 3F, the requestor transportation matching system application 120 can provide the chat system user interface 322 in response to the transfer.

FIGS. 3A-3F illustrate the help access point configuration system 106 generating and providing help access point user interfaces to a requestor computing device. In additional embodiments, the help access point configuration system 106 can also generate and provide help access point user interfaces to a provider computing device. FIGS. 4A-4E illustrate the help access point configuration system 106 generating and providing help access point user interfaces to the user computing device 114 via the transportation matching system application 116 while utilized by a provider.

Figure 4B:
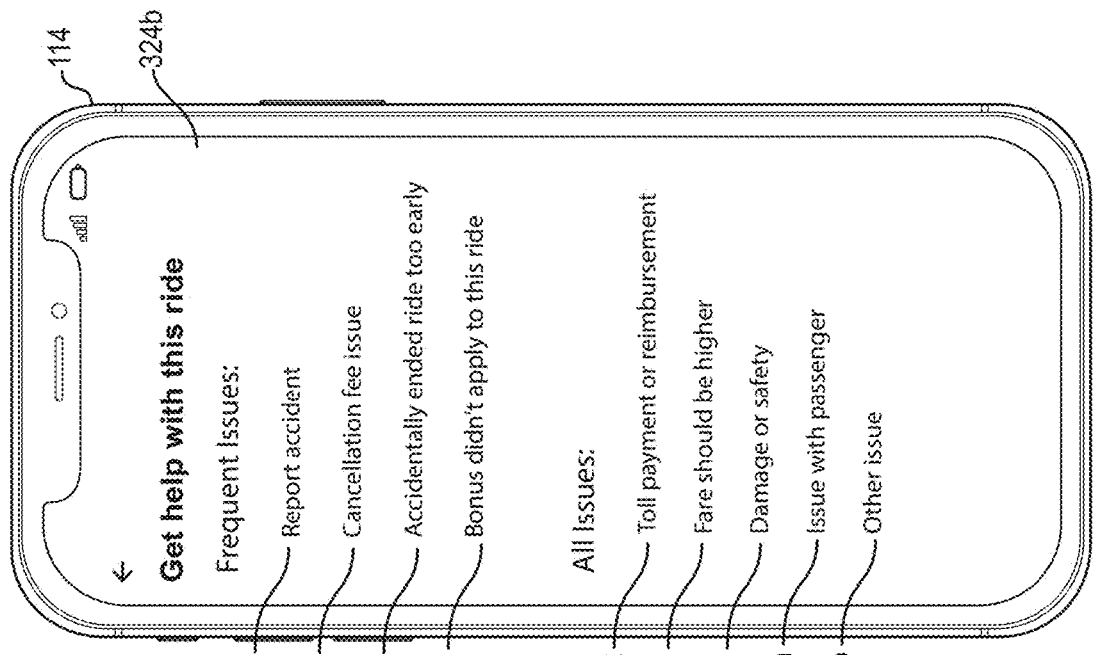
FIGS. 4A-4E illustrate a series of provider help access point user interfaces in accordance with one or more embodiments.
Figure 4A:
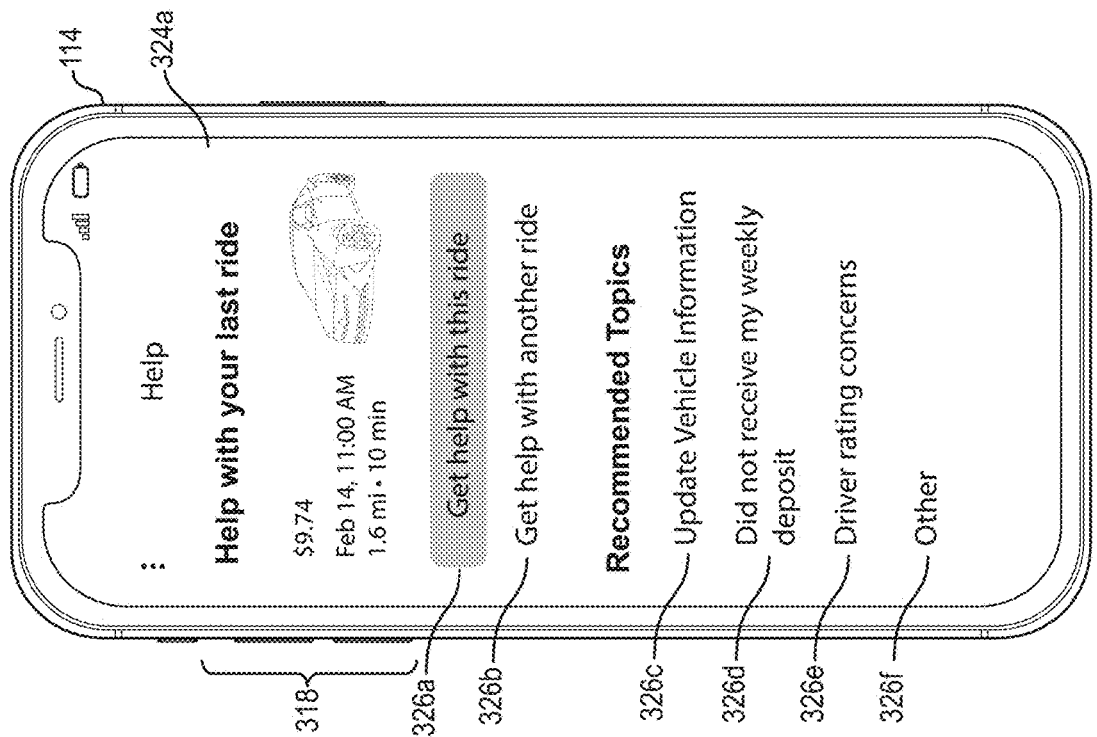

For example, in response detecting a provider interaction with a help access point (e.g., as discussed above with reference to FIGS. 3A and 3B) the transportation matching system application 116 can generate and send a help access point session request to the help access point configuration system 106. In response to receiving the session request from the user computing device 114, the help access point configuration system 106 can establish the session and generate an initial provider help access point user interface. For example, as shown in FIG. 4A, the help access point configuration system 106 can generate and provide the initial provider help access point user interface 324*a* to the user computing device 114 via the transportation matching system application 116. As further shown in FIG. 4A, the help access point configuration system 106 can generate the initial provider help access point user interface 324*a* to include last ride information 318 and provider display components 326*a*, 326*b*, 326*c*, 326*d*, 326*e*, and 326*f*.

As discussed above, in response to receiving an indication of a user interaction with one of the provider display components 326*a*-326*f*, the help access point configuration system 106 can determine a help access point flow position associated with the user computing device 114 and generate an updated user interface. For example, in response to receiving an indication of a user interaction with the provider display component 326*a* (e.g., "Get help with this ride"), the help access point configuration system 106 can determine a flow position associated with the user computing device 114 by analyzing the configuration file associated with the initial provider help access point user interface 324*a*. As a result of this analysis, the help access point configuration system 106 can determine that the flow position associated with the user computing device 114 is the first position in the associated flow hierarchy.

In response to determining the flow position associated with the user computing device 114, and in light of the detected interaction with the provider display component 326*a*, the help access point configuration system 106 can identify a next configuration file in the flow hierarchy and generate an updated user interface utilizing the next configuration file. For example, as shown in FIG. 4B, the help access point configuration system 106 can generate and provide the provider help access point user interface 324*b* including the provider display components 326*g*-326*o*. As discussed above, in response to receiving an indication of a user interaction with at least one of the provider display components 326*g*-326*o*, the help access point configuration system 106 can determine a flow position of the user computing device 114 and generate another updated help access point user interface.

Figure 4D:
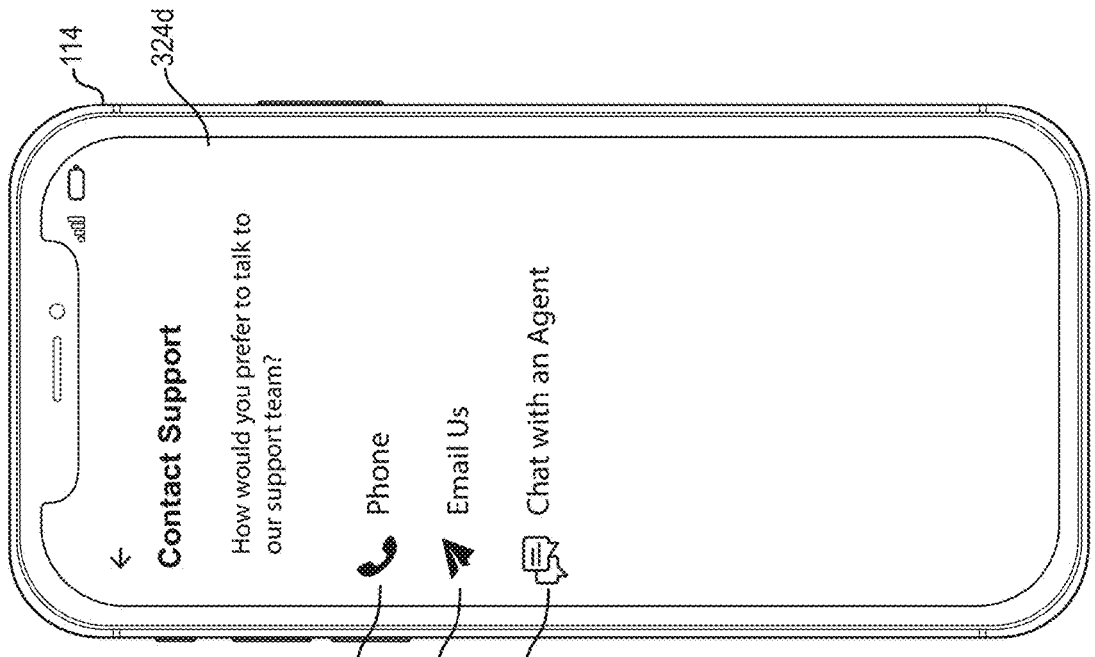
Figure 4C:
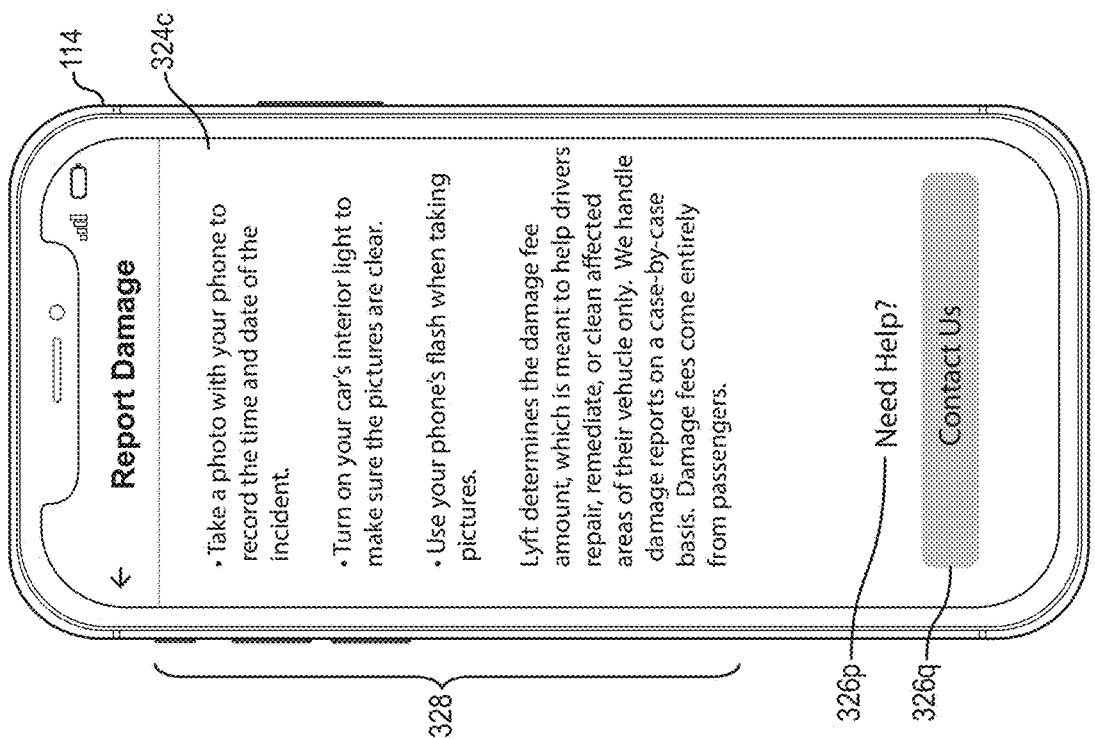

For example, in response to a detected interaction with the provider display component 326*g* and the determined flow position of the user computing device 114, the help access point configuration system 106 can generate and provide the provider help access point user interface 324*c*, as shown in FIG. 4C. As shown, the help access point configuration system 106 can generate the provider help access point user interface 324*c* to include static text 328 and the provider display components 326*p* and 326*q*.

In response to a detected user interaction with the provider display component 326*q*, the help access point configuration system 106 can determine the flow position associated with the user computing device 114, and generate and provide the provider help access point user interface 324*d*, as shown in FIG. 4D. As shown, the help access point configuration system 106 can generate the provider help access point user interface 324*d* to include the provider display components 326*r*-326*t*.

Figure 4E:
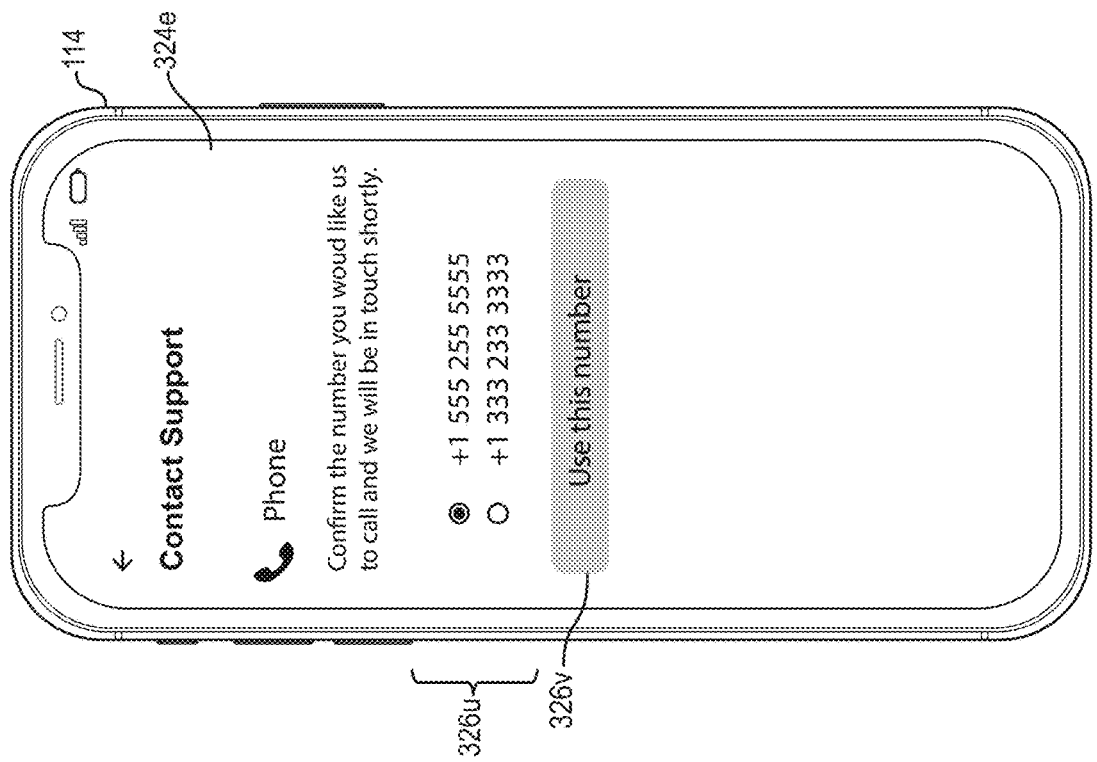

In response to a detected selection of the provider display component 326*r*, the help access point configuration system 106 can determine the flow position associated with the user computing device 114 and generate and provide the provider help access point user interface 324*e*, as shown in FIG. 4E.

As shown, the help access point configuration system 106 can generate the provider help access point user interface 324e to include the provider display component 326u (e.g., radio buttons), and the provider display component 326v. In response to detected interaction with one or both of the provider display components 326u and 326v, the help access point configuration system 106 can determine that the flow position of the user computing device 114 is at the end of the associated flow hierarchy. As discussed above, in response to this determination, the help access point configuration system 106 can generate a help ticket for the transportation matching system help system and end the current session with the user computing device 114.

Figure 5B:
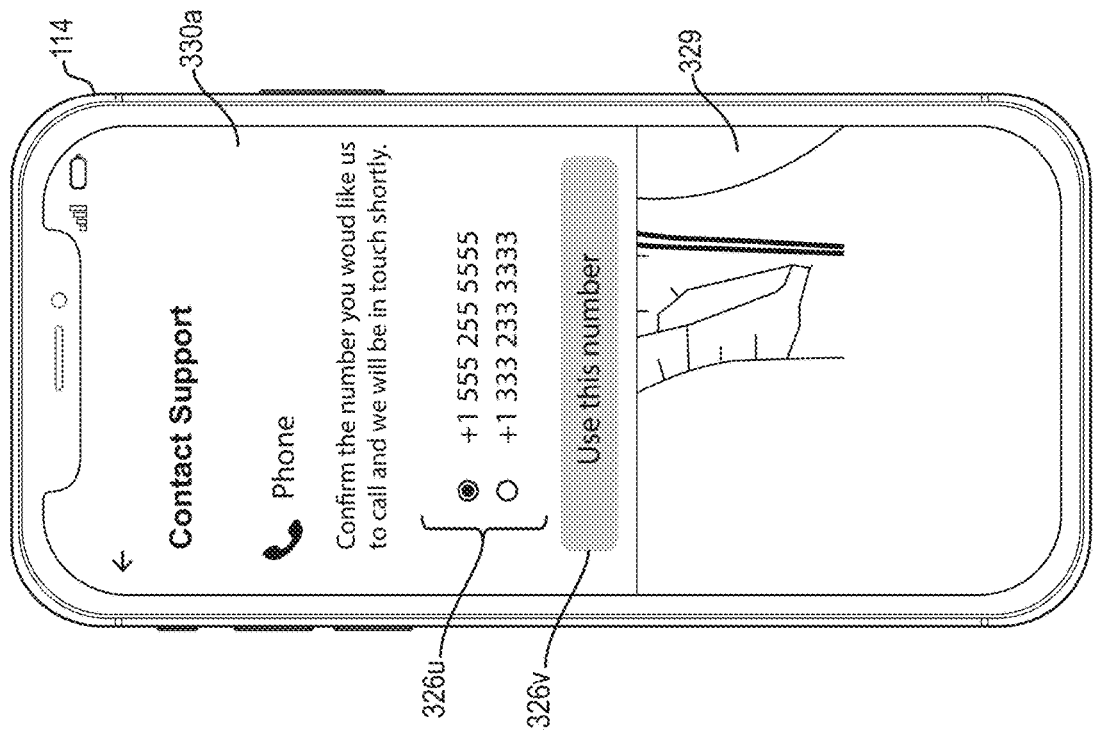
FIGS. 5A-5D illustrate a series of partial provider help access point user interfaces in accordance with one or more embodiments.
Figure 5A:
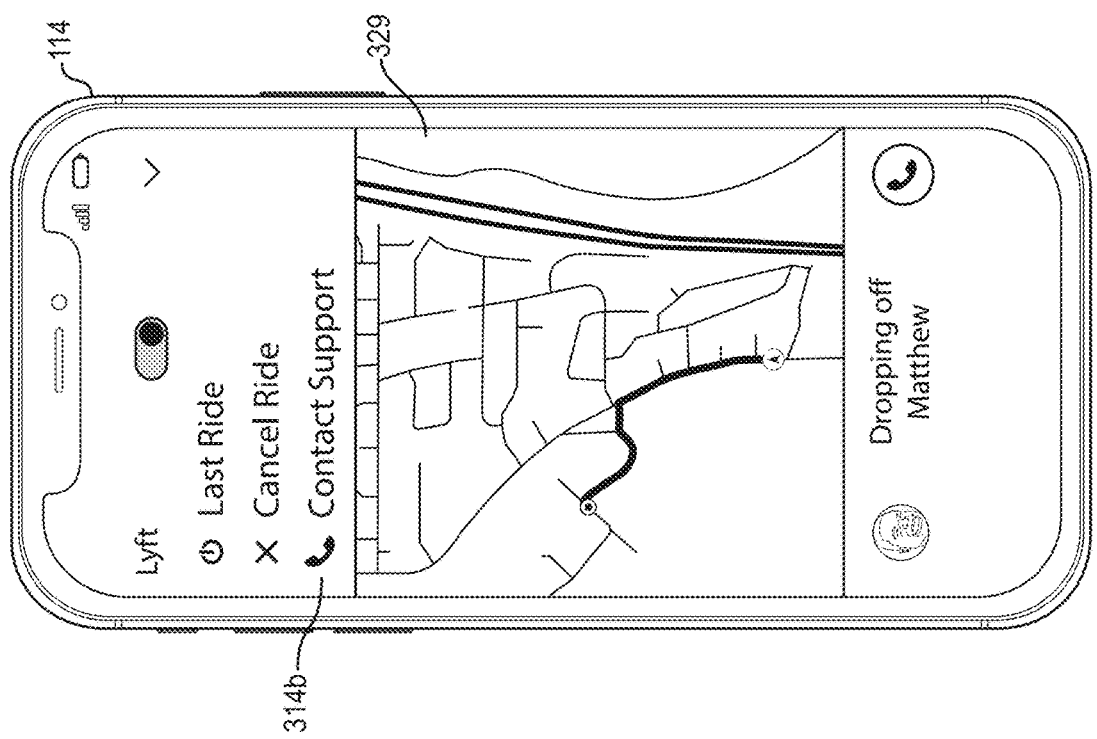

FIGS. 3A-4E illustrate the help access point configuration system 106 generating and providing full-screen help access point user interfaces. In additional embodiments, the help access point configuration system 106 can generate and provider other types of user interfaces. FIGS. 5A-5D illustrate the help access point configuration system 106 generating and providing partial user interface overlays via the transportation matching system application 116 on a provider computing device (e.g., the user computing device 114). For example, as shown in FIG. 5A, transportation matching system 104 can provide the help access point 314b as part of other mid-ride options overlaid on the provider mid-ride display 329.

In response to a detected selection of the help access point 314b, the transportation matching system application 116 can generate a session request, as discussed above, and the help access point configuration system 106 can generate and provide an initial help access point user interface, also as discussed above. For example, as shown in FIG. 5B, the help access point configuration system can provide the partial provider help access point user interface 330a overlaid on the provider mid-ride display 329. As discussed above with reference to FIG. 4E, in response to a detected selection of one or both of the provider display components 326u and 326v, the help access point configuration system 106 can determine the flow position of the user computing device 114 and perform one or more additional actions in response to the determined flow position.

Figure 5D:
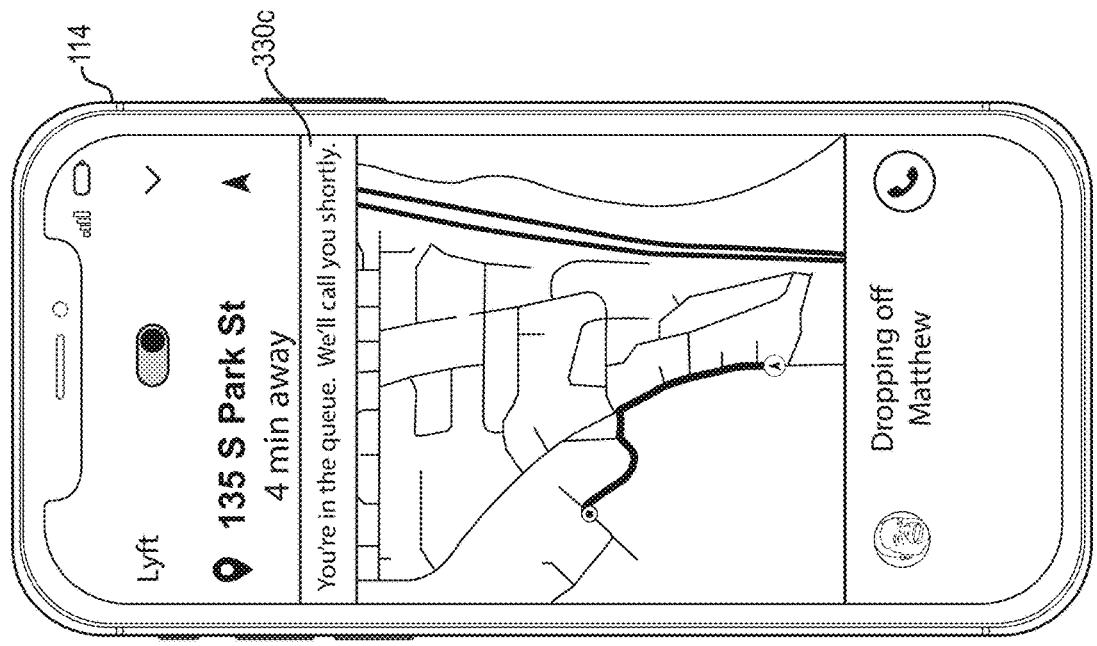
Figure 5C:
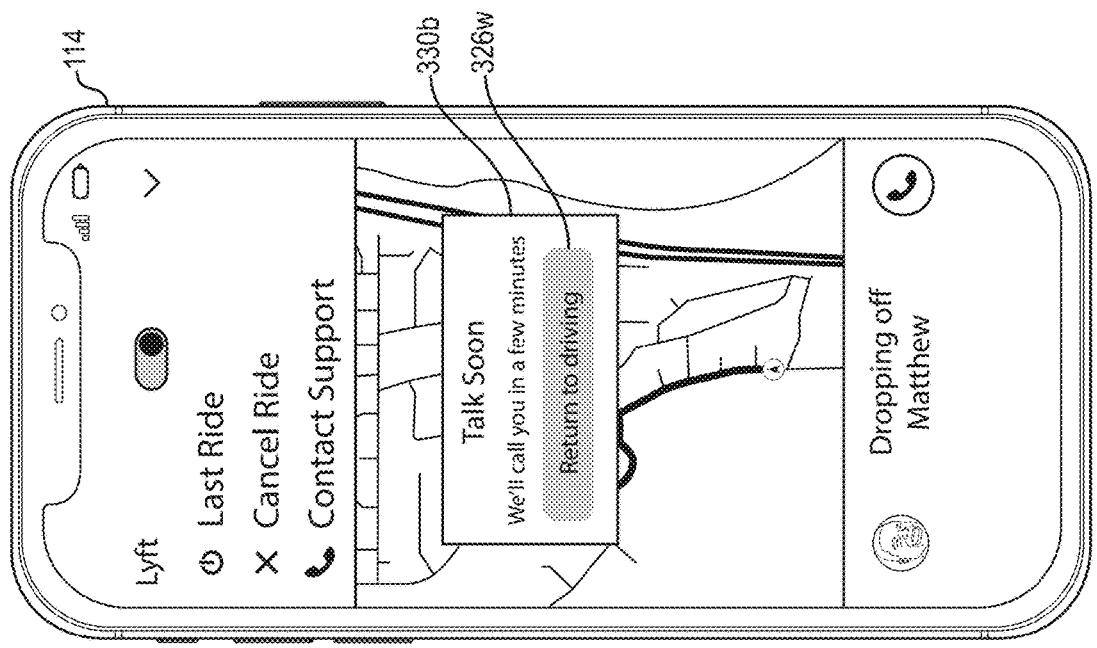

For example, the help access point configuration system 106 can generate a help ticket associated with the user computing device 114, and can provide the generated ticket to the transportation matching system help system for further attention. Also, as shown in FIG. 5C, the help access point configuration system 106 can generate and provide an updated partial provider help access point user interface 330b overlaid on the provider mid-ride display 329. As shown, the updated partial provider help access point user interface 330b can include the provider display component 326w. In response to a detected selection of the provider display component 326w and the determined flow position of the user computing device 114, the help access point configuration system 106 can generate and provide a final partial provider help access point user interface 330c (e.g., as shown in FIG. 5D) and end the present session with the user computing device 114.

As discussed above, the help access point configuration system 106 generates a help access point user interface utilizing a received help access point configuration file. Additional description will now be given with regard to the contents, structure, and format of a help access point configuration file. As an initial matter, in one or more embodiments, the help access point configuration system 106 utilizes help access point configuration files with file names ending in ".step.json." In additional embodiments, the help access point configuration system 106 can utilize help access point configuration files with any type of file name and/or configuration. Furthermore, in at least one embodiment, the help access point configuration system 106 utilizes help access point configuration files with file names that are unique across all help access point configuration files in a help access point flow.

Figure 6:
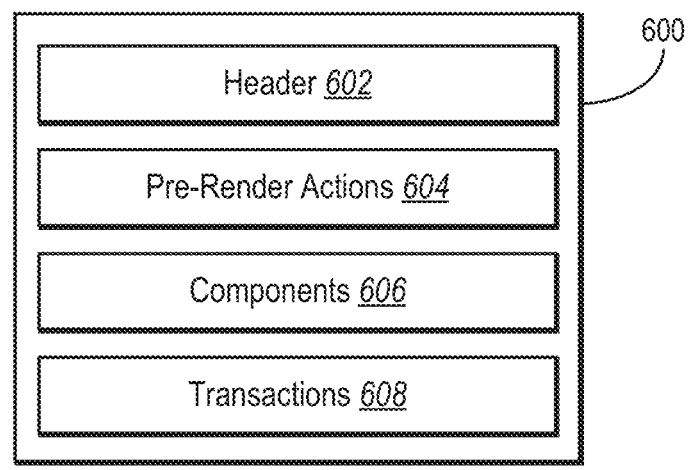
FIG. 6 illustrates an example help access point configuration file in accordance with one or more embodiments.

To illustrate further, FIG. 6 illustrates an overview example help access point configuration file 600. In one or more embodiments, the help access point configuration system 106 utilizes help access point configuration files that are generally structured in the same manner as the help access point configuration file 600. For example, as shown in FIG. 6, the help access point configuration file 600 includes a header section 602, a pre-render activities section 604, a components section 606, and a transitions section 608. In one or more embodiments, the header section 602 includes a presentation style information, step title information, and step name information.

For example, the header section 602 can include presentation style information for presentation style types such as: "navigation," "modal," "fullscreen," and "confirmation." For example, the "navigation" presentation style type indicates that a user interface including this type of presentation style will have a back button on the left side of a top bar on the user interface. The "modal" presentation style type indicates that a user interface including this type of presentation style will be a window on top of a previous step with a dark translucent background. A modal user interface may be made dismissible by including information associated with dismissing the interface in the header section 602. The "fullscreen" presentation style type indicates that a user interface including this type of presentation style will have no back button, and no top bar. Additionally, the "confirmation" presentation style type indicates that a user interface including this type of presentation style will be the same as a user interface associated with "navigation" but with an exit button on the left side of the top bar, and no back button.

Additionally, the header section 602 can include step title information. In one or more embodiments, the value associated with the step title information can be any string of alpha-numeric characters. This string can be a title of a user interface generated utilizing the help access point configuration file 600.

Furthermore, the header section 602 can also include step name information. In one or more embodiments, the string of characters associated with the step name information matches the file name of the help access point configuration file 600 and is unique across all files in the associated help access point flow of help access point configuration files.

In one or more embodiments, a help access point configuration file may represent the first step in a help access point flow. For example, a help access point configuration file that is the first step in a help access point flow includes information indicating that the help access point configuration file is an initial step following the step name information. In at least one embodiment, initial help access point configuration files correspond to the various help access points associated with the help access point configuration system 106. Furthermore, initial help access point configuration files represent a user's entrance into a flow hierarchy of help access point configuration files managed by the help access point configuration system 106.

In one or more embodiments, the header section 602 also includes background color information. By default, background color of any user interface generated by the help access point configuration system 106 is white. In at least one embodiment, a statement indicating that the background color of a user interface is "secondary" in the header section 602 causes the help access point configuration system 106 to display the background color of a resulting user interface as light gray.

As mentioned above, and as shown in FIG. 6, the help access point configuration file 600 also includes a pre-render actions section 604. The information in the pre-render actions section 604 causes the help access point configuration system 106 to gather data needed in rendering display components and determining transitions. In one or more embodiments, when digesting a help access point configuration file, the help access point configuration system 106 performs pre-render actions in the order listed in the pre-render actions section 604 prior to digesting any other section of the help access point configuration file 600. In at least one embodiment, this is because outcomes of pre-render actions may be referenced by later portions of the help access point configuration file 600. Every action in the pre-render action section 604 should have a defined action type and an outcome name. Some action types may also have one or more parameters.

One example action type that may be defined within the pre-render actions section 604 is a run ticket automation action type. In one or more embodiments, this action type runs a provider/requestor ticket automation with a given review reason parameter, and attempts to find a selected route/ride ID within the current session. For example, parameters for the run ticket automation action type can include a pretend parameter, a check if already ran parameter, and a review reason parameter. Each of these parameters will now be discussed in detail.

The pretend parameter sets whether to run the automation in pretend mode or not (e.g., "true" or "false"). In at least one embodiment, this parameter is set to false by default. The check if already ran parameter sets whether to check if this automation has been run in the past or not. This parameter can be set to "true" or "false." In at least one embodiment, the check if already ran parameter may be set to "false" by default. If this parameter is set to "true," the outcome of this parameter can indicate that this automation has already been run with a Boolean value (e.g., true or false). The review reason parameter includes available values and possible reject reasons for both providers and requestors.

In one or more embodiments, as part of the pre-render actions defined in the pre-render actions section 604, the help access point configuration system 106 can automatically fetch user data for use in conditions in any section of the help access point configuration file 600. For example, the help access point configuration system 106 can fetch user data including, but not limited to a user's account information, a user's demographic information, and a user's account status.

As mentioned above and as shown in FIG. 6, the help access point configuration file 600 includes a components section 606. In one or more embodiments, the components section 606 includes a list of component objects that the help access point configuration system 106 renders in order. For example, if a component has conditions defined, the help access point configuration system 106 may not render the component unless all the listed conditions evaluate to true. The help access point configuration system 106 renders any component with no conditions by default.

In at least one embodiment, components defined within the components section 606 are each associated with one of various component types. For example, for help content type components, when the help access point configuration system 106 digests this type of component, the help access point configuration system 106 fetches the specified content file and inserts the specified content file into the list of components in the components section 606. For route list or route selector type components, the help access point configuration system 106 automatically fetches and renders specified routes.

For button and list item button type components, the help access point configuration system 106 attempts to ensure certain requirements are met when defining button interactions by configuring transitions. For example, each button or list item button type component defined in the help access point configuration file 600 should have a unique value. Additionally, each button or list item button type component defined in the help access point configuration file 600 should have a corresponding transition condition defined in the transitions section 608 so as to ensure that a user interaction with a button or list item button leads to a new help access point configuration file.

As mentioned above, and as shown in FIG. 6, the help access point configuration file 600 also includes a transitions section 608. In one or more embodiments, the transitions section 608 defines one or more next help access point configuration files that the help access point configuration system 106 can access depending on a user interaction in connection with the help access point configuration file 600. For example, a first transition defined in the transitions section 608 with all conditions evaluated to true will be the next step taken. If a transition has no conditions defined, it is the default next step. In one or more embodiments, each transition in the transitions section 608 contains next step information which refers to another help access point configuration file. As with the component definitions discussed above, every defined transition in the transitions section 608 may be associated with one or more conditions.

In one or more embodiments, any transition with conditions defined can only have at most one user action condition. Similarly, any user action condition defined as part of a transition should have a value that matches a value defined as part of a component within the components section 606. All conditions, whether defined in the transitions section 608 or the components section 606 should be mutually exclusive and collectively exhaustive, or should include a defined default. This ensures that no transitions will result in an empty user interface.

In one or more embodiments, at the end of a help access point flow, the help access point configuration system 106 initiates a new session with the help access point configuration system 106. For example, as discussed above, the help access point configuration system 106 may detect a user interaction with a user interface that indicates the current session has ended. Thus, a help access point configuration file at the end of a help access point flow may include a statement that triggers a new session with the help access point configuration system 106 associated with the same help access point. For example, this statement can include any button or list item button type component that is set to the initial help access point configuration file in the current hierarchy flow.

As mentioned above, an administrator can generate or otherwise configure a help access point configuration file (e.g., the help access point configuration file 600) utilizing the help access point configuration application 120 on the administrator computing device 108. In one or more embodiments, the help access point configuration application 120 can include a text editor capable of displaying a help access point configuration file for editing.

In alternative embodiments, the help access point configuration application 120 can provide a dedicated series of user interfaces for editing and generating help access point configuration files. For example, the help access point configuration application 120 can provide user interfaces with various levels of abstraction, selectable elements, specialized formatting, and other tools that make for faster and easier editing of a help access point configuration file. In at least one embodiment, these dynamic user interfaces provided by the help access point configuration application 120 lessen the need for help access point configuration system administrators to have specialized engineering knowledge in order to generate help access point configuration files.

Figure 7:
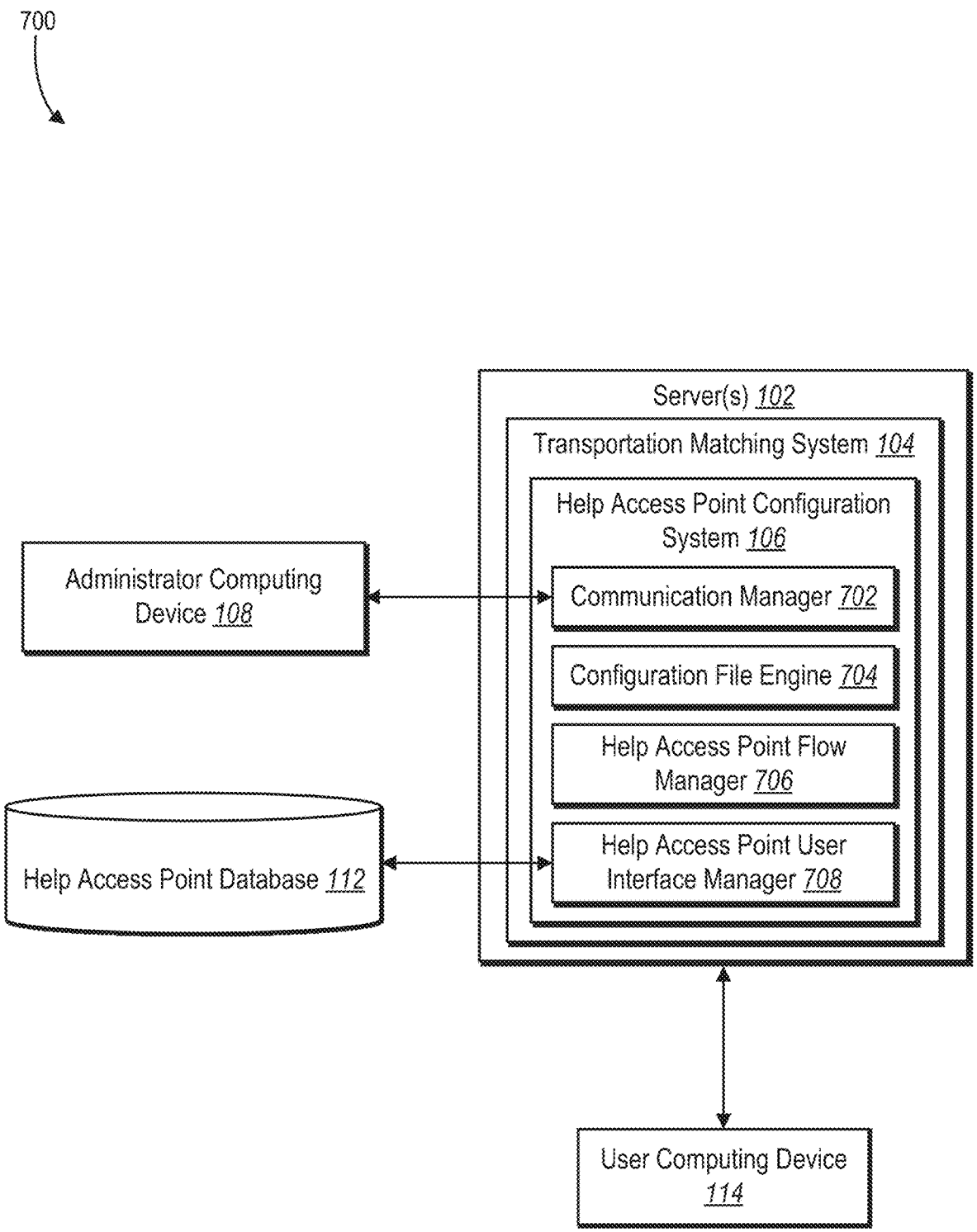
FIG. 7 illustrates a schematic diagram of the help access point configuration system in accordance with one or more embodiments.

FIG. 7 illustrates a schematic diagram illustrating an example embodiment of the help access point configuration system 106. As shown in FIG. 7, the help access point configuration system 106 includes various components for performing the processes and features described herein. For example, as shown in FIG. 7, the help access point configuration system 106 includes a communication manager 702, a configuration file engine 704, a help access point flow manager 706, and a help access point user interface manager 708.

Each of the components 702-708 of the help access point configuration system 106 can be implemented using a computing device including at least one processor executing instructions that cause the performance of the processes described herein. In some embodiments, the components 702-708 of the help access point configuration system 106 can be implemented on a single server or across multiple servers. Additionally or alternatively, a combination of one or more server devices and one or more computing devices can implement the components described herein in a different arrangement than illustrated in FIG. 7. Additionally or alternatively, the components described herein can comprise a combination of computer-executable instructions and hardware.

As illustrated in FIG. 7, the help access point configuration system 106 includes the communication manager 702. In one or more embodiments, the communication manager 702 handles the sending and receiving of information from the help access point configuration system 106 and to user computing devices (e.g., requestor computing devices, provider computing devices, and rider computing devices) and administrator computing devices. For example, the communication manager 702 can receive help access point configuration files from the administrator computing device 108, and send potential error messages back to the administrator computing device 108. Additionally, the communication manager 702 can receive session requests from the user computing device 114, and can provide generated user interfaces to the user computing device 114.

Also as illustrated in FIG. 7, the help access point configuration system 106 includes the configuration file engine 704. In one or more embodiments, the configuration file engine 704 digests receives help access point configuration files. For example, the configuration file engine 704 can parse a configuration file into one or more portions or segments based on keyword analysis, brackets, or tags; thus separating the configuration file into objects, arrays, links, or other segments.

Additionally, the configuration file engine 704 can build one or more help access point flow hierarchies of configuration files. As discussed above, the help access point configuration system 106 may associate every help access point with a flow hierarchy of configuration files associated with that help access point. As such, the configuration file engine 704 can determine an appropriate flow hierarchy to which a configuration file should be added. For example, the configuration file engine 704 can analyze the configuration file determine an associated help access point. The configuration file engine 704 can further analyze one or more transitions in outlined in the configuration file to identify one or more additional configuration files in the appropriate flow hierarchy to which the current configuration file is related. For example, the configuration file engine 704 can identify a first configuration file within the flow hierarchy that transitions to the new configuration file, and can identify a second configuration file within the flow hierarchy that is referenced as a transition within the new configuration file. The configuration file engine 704 can then position the new configuration file within the flow hierarchy at a position between the first and second configuration files.

Additionally, the configuration file engine 704 can perform error checking in connection with a new configuration file. For example, the configuration file engine 704 can determine whether additional configuration files referenced by the new configuration file exist in the help access point database 112. Similarly, the configuration file engine 704 can determine whether display components, static text files, static media files, and other elements of the new configuration file exist within the help access point database 112. The configuration file engine 704 can send any error reporting back to the administrator computing device 108.

As further illustrated in FIG. 7, the help access point configuration system 106 includes the help access point flow manager 706. In one or more embodiments, the help access point flow manager 706 determines a user's flow position at any point during an active help access point session with the help access point configuration system 106. For example, the help access point flow manager 706 can determine that a user is at an initial position in a flow hierarchy associated with a help access point in response to receiving a session request that includes the user type (e.g., requestor or provider) and the help access point type.

Furthermore, the help access point flow manager 706 can determine that a user is at an intermediate position in a flow hierarchy associated with a help access point in response to receiving an indication of a detected user interaction in connection with a display component of a help access point user interface. For example, the help access point flow manager 706 can analyze the received indication to identify the associated user interface and corresponding help access point configuration file. The help access point flow manager 706 can then determine the position of the corresponding help access point configuration file within the associated flow hierarchy in order to identify the user's flow position. Based on the user's flow position and the detected user interaction, the help access point flow manager 706 can then determine and provide the appropriate next help access point configuration file to the help access point user interface manager 708, as will be discussed below.

Additionally, the help access point flow manager 706 can determine that a user is at the end of a flow hierarchy. For example, the help access point flow manager 706 can analyze a received indication of a detected user interaction to determine that the user's flow position is at the end (e.g., associated with a final configuration file) of a flow hierarchy. In response to this determination, the help access point flow manager 706 can signal the end of the current session with the help access point configuration system 106. Similarly, in response to this determination, the help access point flow manager 706 can transfer information (e.g., a user ticket) to another system within the transportation matching system 104.

As mentioned above, and as shown in FIG. 7, the help access point configuration system 106 includes the help access point user interface manager 708. In one or more embodiments, the help access point user interface manager 708 utilizes help access point configuration files to generate help access point user interfaces. For example, as discussed above, the help access point configuration system 106 can analyze a digested configuration file to fetch display components, static text, digital media, and so forth. The help access point user interface manager 708 can further configure display components (e.g., buttons) with transition information based on the associated configuration file. The help access point user interface manager 708 can further provide the generated user interfaces to the user computing device 114. In additional or alternative embodiments, the help access point user interface manager 708 can provide the fetched and configured display components along with display instructions to the user computing device 114 instead of a fully generated user interface.

Figure 8:
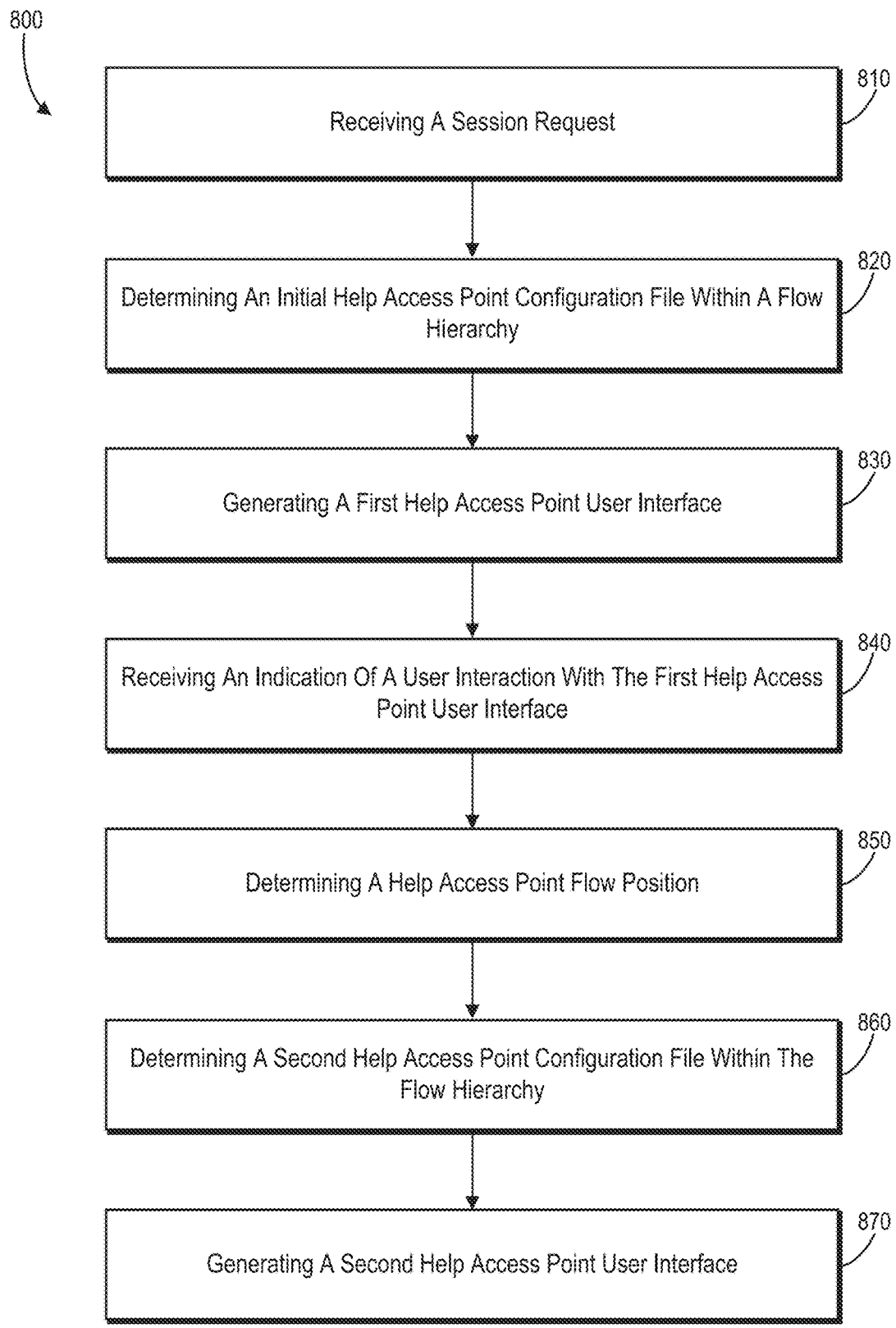
FIG. 8 illustrates a flowchart of a series of acts for generating and providing help access point user interfaces in accordance with one or more embodiments.

Turning now to FIG. 8, this figure illustrates a flowchart of a series of acts 800 in generating help access point user interfaces for a user device based on received help access point configuration files. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further embodiments, a system can perform the acts of FIG. 8.

As shown in FIG. 8, the series of acts 800 includes an act 810 of receiving a session request. For example, the act 810 can involve receiving, from a user computing device, a session request for help associated with an account. In one or more embodiments, the series of acts 800 further includes, in response to receiving the help access point session request, initiating a help access point session associated with the user computing device. In at least one embodiment, the session request includes account information associated with the user of the user computing device, and information associated with a detected user interaction that initiated the session request.

Furthermore, the series of acts 800 includes an act 820 of determining an initial help access point configuration file within a flow hierarchy. For example, the act 820 can involve determining an initial help access point configuration file within a flow hierarchy that corresponds to the session request. In one or more embodiments, determining the initial help access point configuration file within the flow hierarchy that corresponds to the session request includes analyzing the account information associated with the user of the user computing device to determine a user type associated with the user; analyzing the information associated with the detected user interaction that initiated the help access point session request to determine a type of session requested; identifying, based on the user type associated with the user and the type of session requested, the flow hierarchy; and determining the initial help access point configuration file within the flow hierarchy.

As shown in FIG. 8, the series of acts 800 includes an act 830 of generating a first help access point user interface. For example, the act 830 can involve generating, based on the initial help access point configuration file, a first help access point user interface that is specifically configured to address a type of request associated with the session request. In one or more embodiments, generating the first help access point user interface includes identifying, based on the initial help access point configuration file, one or more display components, and positioning, based on the initial help access point configuration file, the one or more display components within the first help access point user interface.

The series of acts 800 also includes an act 840 of receiving an indication of a user interaction with the first help access point user interface. For example, the act 840 can involve receiving, from the user computing device, an indication of a user interaction with at least one display component of the first help access point user interface. In one or more embodiments, receiving an indication of a user interaction with at least one display component of the first help access point user interface includes receiving an indication of a user interaction with a transition display component of the first help access point user interface.

As further shown in FIG. 8, the series of acts 800 includes an act 850 of determining a help access point flow position. For example, the act 850 can involve determining, based on the received indication of the user interaction with at least one display component of the first help access point user interface, a help access point flow position associated with the user computing device. In one or more embodiments, determining, based on the received indication, the help access point flow position associated with the user computing device comprises determining a position associated with the initial help access point configuration file within the flow hierarchy that corresponds to the session request.

As shown in FIG. 8, the series of acts 800 includes an act 860 of determining a second help access point configuration file within the flow hierarchy. For example, the act 860 can involve determining, within the flow hierarchy and based on the determined help access point flow position and the received indication of the user interaction, a second help access point configuration file. In one or more embodiments, the series of acts 800 includes receiving, from an administrator computing device associated with a dynamic transportation matching system, the initial help access point configuration file and the second help access point configuration file. Additionally, in one or more embodiments, the series of acts 800 includes an act of generating the flow hierarchy by identifying at least one transition in the initial help access point configuration file that references the second help access point configuration file, and generating the flow hierarchy representing the hierarchical relationship between the initial help access point configuration file and the second help access point configuration file based on the at least one transition.

Additionally, as shown in FIG. 8, the series of acts 800 includes an act 870 of generating a second help access point user interface. For example, the act 860 can involve generating, based on the second help access point configuration file, a second help access point user interface. In one or more embodiments, the series of acts 800 further includes acts of receiving, from the user computing device, an indication of a user interaction with at least one display component of the second help access point user interface, and determining, based on the received indication of the user interaction with at least one display component of the second help access point user interface, to end the help access point session associated with the user computing device.

Figure 9:
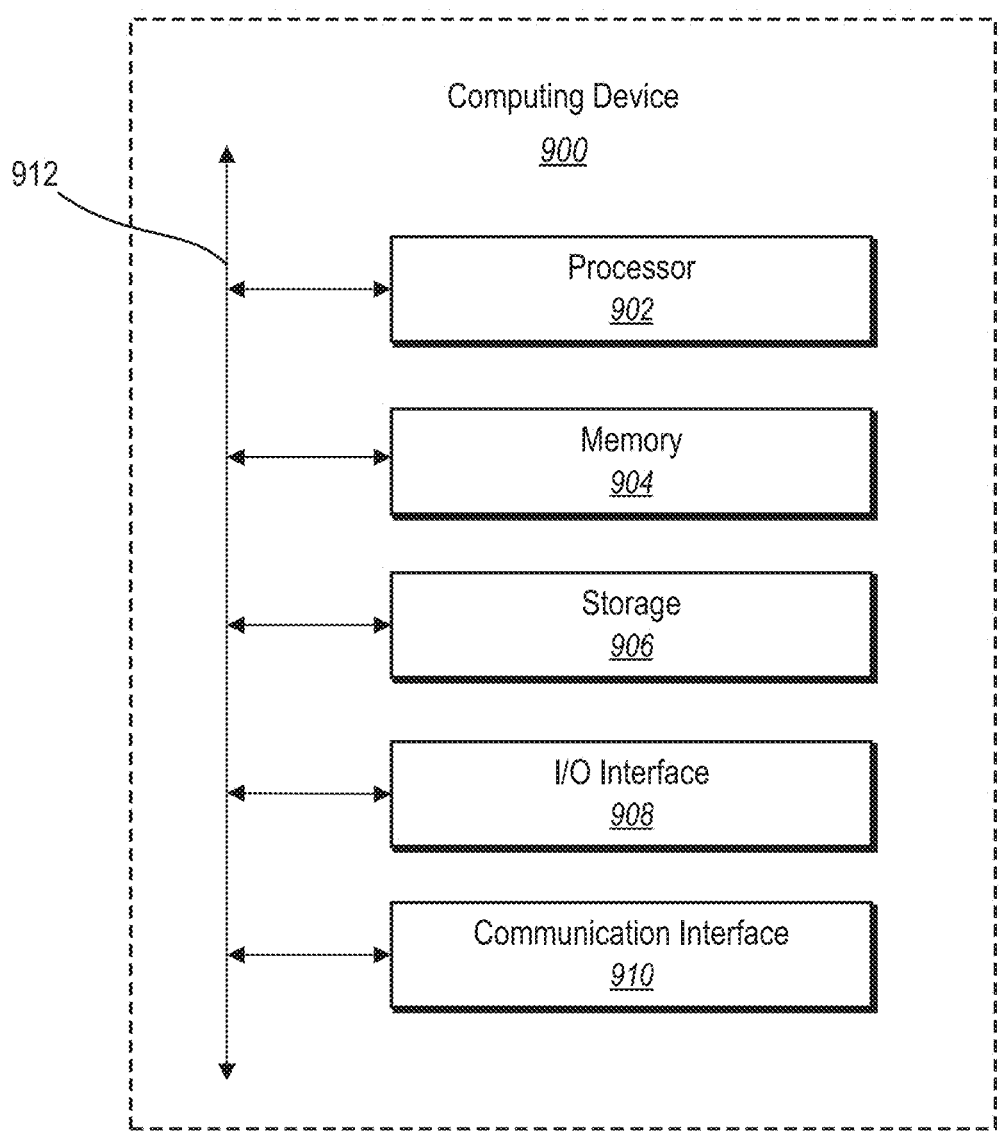
FIG. 9 illustrates a block diagram of an exemplary computing device in accordance with one or more embodiments.

FIG. 9 shows an example computing device 900, in accordance with various embodiments. In one or more embodiments, the computing device 900 may be used to implement any of the systems, devices, or methods described herein. In some embodiments, the computing device 900 may correspond to any of the various devices described herein, including, but not limited to, mobile devices, tablet computing devices, wearable devices, personal or laptop computers, vehicle-based computing devices, or other devices or systems described herein. As shown in FIG. 9, the computing device 900 can include various subsystems connected by a bus 902. The subsystems may include an I/O device subsystem 904, a display device subsystem 906, and a storage subsystem 910 including one or more computer readable storage media 908. The subsystems may also include a memory subsystem 912, a communication subsystem 920, and a processing subsystem 922.

In the computing device 900, the bus 902 facilitates communication between the various subsystems. Although a single bus 902 is shown, alternative bus configurations may also be used. The bus 902 may include any bus or other component to facilitate such communication as is known to one of ordinary skill in the art. Examples of such bus systems may include a local bus, parallel bus, serial bus, bus network, and/or multiple bus systems coordinated by a bus controller. The bus 902 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, the I/O device subsystem 904 may include various input and/or output devices or interfaces for communication with such devices. Such devices may include, without limitation, a touch screen display or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. The I/O device subsystem 904 may also include identification or authentication devices, such as fingerprint scanners, voiceprint scanners, iris scanners, or other biometric sensors or detectors. In various embodiments, the I/O device subsystem 904 may include audio output devices, such as speakers, media players, or other output devices.

The computing device 900 may include a display device subsystem 906. The display device subsystem 906 may include one or more lights, such as one or more light emitting diodes (LEDs), LED arrays, a liquid crystal display (LCD) or plasma display or other flat-screen display, a touch screen, a head-mounted display or other wearable display device, a projections device, a cathode ray tube (CRT), and any other display technology configured to visually convey information. In various embodiments, the display device subsystem 906 may include a controller and/or interface for controlling and/or communicating with an external display, such as any of the above-mentioned display technologies.

As shown in FIG. 9, the computing device 900 may include the storage subsystem 910 including various computer readable storage media 908, such as hard disk drives, solid state drives (including RAM-based and/or flash-based SSDs), or other storage devices. In one or more embodiments, the computer readable storage media 908 is configurable to store software, including programs, code, or other instructions, that is executable by a processor to provide functionality described herein. In some embodiments, the storage subsystem 910 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, the storage subsystem 910 can include a media reader, card reader, or other storage interface to communicate with one or more external and/or removable storage devices. In various embodiments, the computer readable storage media 908 can include any appropriate storage medium or combination of storage media. For example, the computer readable storage media 908 can include, but is not limited to, any one or more of random access memory (RAM), read only memory (ROM), electronically erasable programmable ROM (EEPROM), flash memory or other memory technology, optical storage (e.g., CD-ROM, DVD, Blu-ray® disk or other optical storage device), magnetic storage (e.g., tape drives, cassettes, magnetic disk storage or other magnetic storage devices). In some embodiments, the computer readable storage media 908 can include data signals or any other medium through which data can be sent and/or received.

The memory subsystem 912 can include various types of memory, including RAM, ROM, flash memory, or other memory. The memory subsystem 912 can include SRAM (static RAM) or DRAM (dynamic RAM). In some embodiments, the memory subsystem 912 can include a BIOS (basic input/output system) or other firmware configured to manage initialization of various components during for example startup. As shown in FIG. 9, the memory subsystem 912 can include applications 914 and application data 916. The applications 914 may include programs, code, or other instructions, that can be executed by a processor. The applications 914 can include various applications such as browser clients, location management applications, ride management applications, data management application, and any other application. The application data 916 can include any data produced and/or consumed by the applications 914. The memory subsystem 912 can additionally include operating system, such as macOS®, Windows®, Linux®, various UNIX® or UNIX- or Linux-based operating systems or other operating systems.

The computing device 900 can also include a communication subsystem configured to facilitate communication between the computing device 900 and various external computer systems and/or networks (such as the Internet, a LAN, a WAN, a mobile network, or any other network). The communication subsystem can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally or alternatively, the communication subsystem can include hardware and/or software components to communicate with satellite-based or ground-based location services, such as GPS (global positioning system). In some embodiments, the communication subsystem may include, or interface with, various hardware or software sensors. The sensors may be configured to provide continuous and/or periodic data or data streams to a computer system through the communication subsystem.

Figure 10:
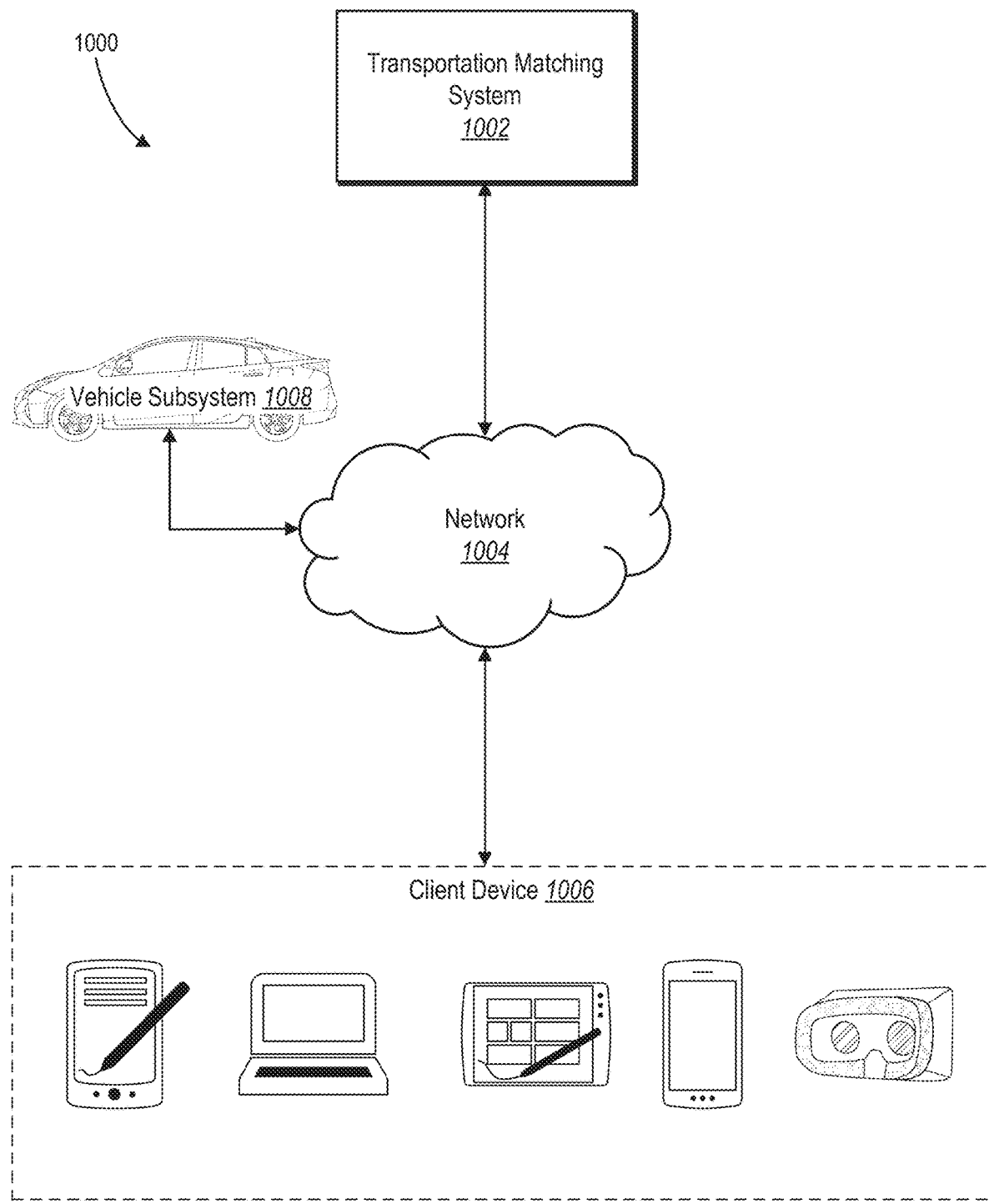
FIG. 10 illustrates an example network environment of a transportation matching system in accordance with one or more embodiments.

As shown in FIG. 9, the processing subsystem can include one or more processors or other devices operable to control the computing device 900. Such processors can include the single core processors, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing subsystem may be used independently or in combination depending on the application FIG. 10 illustrates an example network environment 1000 of a transportation matching system (e.g., the transportation matching system 104). The network environment 1000 includes a client device 1006, a transportation matching system 1002, and a vehicle subsystem 1008 connected to each other by a network 1004. Although FIG. 10 illustrates a particular arrangement of the client device 1006, the transportation matching system 1002, the vehicle subsystem 1008, and the network 1004, this disclosure contemplates any suitable arrangement of the client device 1006, the transportation matching system 1002, the vehicle subsystem 1008, and the network 1004. As an example, and not by way of limitation, two or more of the client device 1006, the transportation matching system 1002, and the vehicle subsystem 1008 communicate directly, bypassing the network 1004. As another example, two or more of the client device 1006, the transportation matching system 1002, and the vehicle subsystem 1008 may be physically or logically co-located with each other in whole or in part. Moreover, although FIG. 10 illustrates a particular number of the client devices 1006, the transportation matching systems 1002, the vehicle subsystems 1008, and the networks 1004, this disclosure contemplates any suitable number of the client devices 1006, the transportation matching systems 1002, the vehicle subsystems 1008, and the networks 1004. As an example, and not by way of limitation, the network environment 1000 may include multiple client devices 1006, the transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 8. A client device 1006 may enable a network user at the client device 1006 to access a network. A client device 1006 may enable its user to communicate with other users at other client devices 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1002 may be a network-addressable computing system that can host a ride share transportation network. The transportation matching system 1002 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1002. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1002 may manage ride matching services to connect a user/requester with a vehicle and/or provider. By managing the ride matching services, the transportation matching system 1002 can manage the distribution and allocation of vehicle subsystem resources and user resources such as GPS location and availability indicators, as described herein.

The transportation matching system 1002 may be accessed by the other components of the network environment 1000 either directly or via network 1004. In particular embodiments, the transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a transportation matching system 1002 to manage, retrieve, modify, add, or delete, the information stored in data store.

In particular embodiments, the transportation matching system 1002 may provide users with the ability to take actions on various types of items or objects, supported by the transportation matching system 1002. As an example, and not by way of limitation, the items and objects may include ride share networks to which users of the transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1002 or by an external system of a third-party system, which is separate from the transportation matching system 1002 and coupled to the transportation matching system 1002 via a network 1004.

In particular embodiments, the transportation matching system 1002 may be capable of linking a variety of entities. As an example, and not by way of limitation, the transportation matching system 1002 may enable users to interact with each other or other entities, or to allow users to interact with these entities through an application programming interfaces (API) or other communication channels.

In particular embodiments, the transportation matching system 1002 may include a variety of servers, sub-systems, programs, modules, logs, and data stores. In particular embodiments, the transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1002 may also include suitable components such as network interfaces, security mechanisms, load balancers, failover servers, management-and-network-operations consoles, other suitable components, or any suitable combination thereof. In particular embodiments, the transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1002 and one or more client devices 1006. An action logger may be used to receive communications from a web server about a user's actions on or off the transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the transportation matching system 1002. A privacy setting of a user determines how particular information associated with a user can be shared. The authorization server may allow users to opt in to or opt out of having their actions logged by the transportation matching system 1002 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   receiving, from a user computing device, a session request for help associated with an account;
   determining an initial help access point configuration file within a flow hierarchy that corresponds to the session request;
   generating, based on the initial help access point configuration file, a first help access point user interface that is specifically configured to address a type of request associated with the session request;
   receiving, from the user computing device, an indication of a user interaction with at least one display component of the first help access point user interface;
   determining, based on the received indication of the user interaction with at least one display component of the first help access point user interface, a help access point flow position associated with the user computing device;
   determining, within the flow hierarchy and based on the determined help access point flow position and the received indication of the user interaction, a second help access point configuration file; and
   generating, based on the second help access point configuration file, a second help access point user interface.

2. The method as recited in claim 1, further comprising receiving, from an administrator computing device associated with a dynamic transportation matching system, the initial help access point configuration file and the second help access point configuration file.

3. The method as recited in claim 1, wherein the session request comprises account information associated with the user of the user computing device, and information associated with a detected user interaction that initiated the session request.

4. The method as recited in claim 3, wherein determining the initial help access point configuration file within the flow hierarchy that corresponds to the session request comprises:
   analyzing the account information associated with the user of the user computing device to determine a user type associated with the user;
   analyzing the information associated with the detected user interaction that initiated the help access point session request to determine a type of session requested;
   identifying, based on the user type associated with the user and the type of session requested, the flow hierarchy; and
   determining the initial help access point configuration file within the flow hierarchy.

5. The method as recited in claim 1, wherein generating the first help access point user interface comprises:
   identifying, based on the initial help access point configuration file, one or more display components; and
   positioning, based on the initial help access point configuration file, the one or more display components within the first help access point user interface.

6. The method as recited in claim 1, further comprising generating the flow hierarchy by:
   identifying at least one transition in the initial help access point configuration file that references the second help access point configuration file; and
   generating the flow hierarchy representing the hierarchical relationship between the initial help access point configuration file and the second help access point configuration file based on the at least one transition.

7. The method as recited in claim 1, further comprising:
   receiving, from the user computing device, an indication of a user interaction with at least one display component of the second help access point user interface; and
   determining, based on the received indication of the user interaction with at least one display component of the second help access point user interface, to end a help access point session associated with the user computing device.

8. A computing device comprising:
at least one processor; and
at least one non-transitory computer-readable storage medium storing instructions thereon that, when executed by the at least one processor, cause the computing device to:
receive, from a user computing device, a session request for help associated with an account;
determine an initial help access point configuration file within a flow hierarchy that corresponds to the session request;
generate, based on the initial help access point configuration file, a first help access point user interface that is specifically configured to address a type of request associated with the session request;
receive, from the user computing device, an indication of a user interaction with at least one display component of the first help access point user interface;
determine, based on the received indication of the user interaction with at least one display component of the first help access point user interface, a help access point flow position associated with the user computing device;
determine, within the flow hierarchy and based on the determined help access point flow position and the received indication of the user interaction, a second help access point configuration file; and
generate, based on the second help access point configuration file, a second help access point user interface.

9. The computing device as recited in claim 8, further storing instructions thereon that, when executed by the at least one processor, cause the computing device to receive, from an administrator computing device associated with a dynamic transportation matching system, the initial help access point configuration file and the second help access point configuration file.

10. The computing device as recited in claim 8, wherein the session request comprises account information associated with the user of the user computing device, and information associated with a detected user interaction that initiated the session request.

11. The computing device as recited in claim 10, further storing instructions thereon that, when executed by the at least one processor, cause the computing device to determine the initial help access point configuration file within the flow hierarchy that corresponds to the session request by:
analyzing the account information associated with the user of the user computing device to determine a user type associated with the user;
analyzing the information associated with the detected user interaction that initiated the help access point session request to determine a type of session requested;
identifying, based on the user type associated with the user and the type of session requested, the flow hierarchy; and
determining the initial help access point configuration file within the flow hierarchy.

12. The computing device as recited in claim 8, further storing instructions thereon that, when executed by the at least one processor, cause the computing device to generate the first help access point user interface by:
identifying, based on the initial help access point configuration file, one or more display components; and
positioning, based on the initial help access point configuration file, the one or more display components within the first help access point user interface.

13. The computing device as recited in claim 8, further storing instructions thereon that, when executed by the at least one processor, further cause the computing device to generate the flow hierarchy by:
identifying at least one transition in the initial help access point configuration file that references the second help access point configuration file; and
generating the flow hierarchy representing the hierarchical relationship between the initial help access point configuration file and the second help access point configuration file based on the at least one transition.

14. The computing device as recited in claim 8, further storing instructions there on that, when executed by the at least one processor, cause the computing device to:
receive, from the user computing device, an indication of a user interaction with at least one display component of the second help access point user interface; and
determine, based on the received indication of the user interaction with at least one display component of the second help access point user interface, to end a help access point session associated with the user computing device.

15. A non-transitory computer-readable medium storing instructions thereon that, when executed by at least one processor, cause a system to:
receive, from a user computing device, a session request for help associated with an account;
determine an initial help access point configuration file within a flow hierarchy that corresponds to the session request;
generate, based on the initial help access point configuration file, a first help access point user interface that is specifically configured to address a type of request associated with the session request;
receive, from the user computing device, an indication of a user interaction with at least one display component of the first help access point user interface;
determine, based on the received indication of the user interaction with at least one display component of the first help access point user interface, a help access point flow position associated with the user computing device;
determine, within the flow hierarchy and based on the determined help access point flow position and the received indication of the user interaction, a second help access point configuration file; and
generate, based on the second help access point configuration file, a second help access point user interface.

16. The non-transitory computer-readable medium as recited in claim 15, further storing instructions thereon that, when executed by the at least one processor, cause a system to receive, from an administrator computing device associated with a dynamic transportation matching system, the initial help access point configuration file and the second help access point configuration file.

17. The non-transitory computer-readable medium as recited in claim 15, wherein the session request comprises account information associated with the user of the user computing device, and information associated with a detected user interaction that initiated the session request.

18. The non-transitory computer-readable medium as recited in claim 17, further storing instructions thereon that, when executed by the at least one processor, cause a system to determine the initial help access point configuration file within the flow hierarchy that corresponds to the session request by:

analyzing the account information associated with the user of the user computing device to determine a user type associated with the user;

analyzing the information associated with the detected user interaction that initiated the help access point session request to determine a type of session requested;

identifying, based on the user type associated with the user and the type of session requested, the flow hierarchy; and determining the initial help access point configuration file within the flow hierarchy.

19. The non-transitory computer-readable medium as recited in claim 15, further storing instructions thereon that, when executed by the at least one processor, cause a system to generate the first help access point user interface by:

identifying, based on the initial help access point configuration file, one or more display components; and positioning, based on the initial help access point configuration file, the one or more display components within the first help access point user interface.

20. The non-transitory computer-readable medium as recited in claim 15, further storing instructions thereon that, when executed by the at least one processor, cause a system to generate the flow hierarchy by:

identifying at least one transition in the initial help access point configuration file that references the second help access point configuration file; and generating the flow hierarchy representing the hierarchical relationship between the initial help access point configuration file and the second help access point configuration file based on the at least one transition.

* * * * *